(12) United States Patent
Gruhlke et al.

(10) Patent No.: US 8,368,981 B2
(45) Date of Patent: Feb. 5, 2013

(54) DISPLAY DEVICE WITH DIFFRACTIVE OPTICS

(75) Inventors: Russell Wayne Gruhlke, Milpitas, CA (US); Ion Bita, San Jose, CA (US); Marek Mienko, San Jose, CA (US); Gang Xu, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 379 days.

(21) Appl. No.: 12/419,263

(22) Filed: Apr. 6, 2009

(65) Prior Publication Data

US 2009/0251752 A1    Oct. 8, 2009

Related U.S. Application Data

(63) Continuation of application No. PCT/US2007/021623, filed on Oct. 9, 2007.

(60) Provisional application No. 60/850,759, filed on Oct. 10, 2006.

(51) Int. Cl.
G02B 5/32 (2006.01)

(52) U.S. Cl. ............... 359/15; 362/551; 385/37

(58) Field of Classification Search ........... 359/15, 359/28, 34; 362/551–582; 385/37
See application file for complete search history.

(56) References Cited

U.S. PATENT DOCUMENTS

| | | |
|---|---|---|
| 2,518,647 A | 8/1950 | Teeple et al. |
| 3,813,265 A | 5/1974 | Marks |
| 4,378,567 A | 3/1983 | Mir |
| 4,832,459 A | 5/1989 | Harper |
| 4,850,682 A | 7/1989 | Gerritsen |
| 4,863,224 A | 9/1989 | Afian |
| 4,915,479 A | 4/1990 | Clarke |
| 4,918,577 A | 4/1990 | Furudate |
| 4,947,291 A | 8/1990 | McDermott |
| 4,961,617 A | 10/1990 | Shahidi |
| 4,974,942 A | 12/1990 | Gross |
| 5,038,224 A | 8/1991 | Martulli et al. |
| 5,042,921 A | 8/1991 | Sato et al. |
| 5,110,370 A | 5/1992 | Vogeli et al. |
| 5,151,585 A | 9/1992 | Seibert |
| 5,226,099 A | 7/1993 | Mignardi et al. |
| 5,261,970 A | 11/1993 | Landis et al. |
| 5,272,496 A | 12/1993 | Nicolas et al. |
| 5,278,680 A | 1/1994 | Karasawa et al. |
| 5,283,600 A | 2/1994 | Imai |
| 5,289,300 A | 2/1994 | Yamazaki |

(Continued)

FOREIGN PATENT DOCUMENTS

| | | |
|---|---|---|
| CA | 2 490 975 | 1/2004 |
| CN | 1272922 | 11/2000 |

(Continued)

OTHER PUBLICATIONS

International Search Report and Written Opinion for Application No. PCT/US2007/021623, dated Oct. 22, 2008.

(Continued)

*Primary Examiner* — Jennifer L. Doak
(74) *Attorney, Agent, or Firm* — Knobbe Martens Olson & Bear LLP

(57) ABSTRACT

Light modulator displays may be illuminated using a light guide comprising diffractive optics that directs light onto the light modulators. The light guide may comprise, for example, a holographic light turning element that turns light propagating within the light guide onto the array of light modulators. In some embodiments, the holographic element has multiple holographic functions. For example, the holographic element may additionally collimate ambient light or diffuse light reflected form the light modulators.

25 Claims, 12 Drawing Sheets

U.S. PATENT DOCUMENTS

| | | | |
|---|---|---|---|
| 5,339,179 A | 8/1994 | Rudisill |
| 5,361,190 A | 11/1994 | Roberts et al. |
| 5,387,953 A | 2/1995 | Minoura et al. |
| 5,387,991 A | 2/1995 | Mitsutake et al. |
| 5,398,125 A | 3/1995 | Willett |
| 5,446,510 A | 8/1995 | Mitsutake et al. |
| 5,448,659 A | 9/1995 | Tsutsui et al. |
| 5,452,385 A | 9/1995 | Izumi |
| 5,459,610 A | 10/1995 | Bloom et al. |
| 5,467,417 A | 11/1995 | Nakamura |
| 5,481,385 A | 1/1996 | Zimmerman et al. |
| 5,515,184 A | 5/1996 | Caulfield et al. |
| 5,517,366 A | 5/1996 | Togino |
| 5,555,186 A | 9/1996 | Shioya |
| 5,594,830 A | 1/1997 | Winston |
| 5,601,351 A | 2/1997 | van den Brandt |
| 5,626,408 A | 5/1997 | Heynderickx et al. |
| 5,638,084 A | 6/1997 | Kalt |
| 5,647,036 A | 7/1997 | Deacon |
| 5,650,865 A | 7/1997 | Smith |
| 5,659,410 A | 8/1997 | Koike |
| 5,671,314 A | 9/1997 | Gregory et al. |
| 5,703,667 A | 12/1997 | Ochiai |
| 5,735,590 A | 4/1998 | Kashima |
| 5,749,642 A | 5/1998 | Kimura et al. |
| 5,771,124 A | 6/1998 | Kintz |
| 5,771,321 A | 6/1998 | Stern |
| 5,772,299 A | 6/1998 | Koo et al. |
| 5,782,993 A | 7/1998 | Ponewash |
| 5,783,614 A | 7/1998 | Chen |
| 5,805,117 A | 9/1998 | Mazurek |
| 5,810,464 A | 9/1998 | Ishikawa |
| 5,815,229 A | 9/1998 | Shapiro |
| 5,853,240 A | 12/1998 | Tanaka et al. |
| 5,854,872 A | 12/1998 | Tai |
| 5,892,598 A | 4/1999 | Asakawa et al. |
| 5,913,594 A | 6/1999 | Iimura |
| 5,914,804 A | 6/1999 | Goossen |
| 5,933,183 A | 8/1999 | Enomoto |
| 5,975,703 A | 11/1999 | Holman |
| 5,982,540 A | 11/1999 | Koike |
| 5,991,073 A | 11/1999 | Woodgate et al. |
| 5,999,239 A | 12/1999 | Larson |
| 6,002,829 A | 12/1999 | Winston |
| 6,008,449 A | 12/1999 | Cole |
| 6,014,192 A | 1/2000 | Lehureau et al. |
| 6,023,373 A | 2/2000 | Inoguchi et al. |
| 6,040,937 A | 3/2000 | Miles |
| 6,048,071 A | 4/2000 | Sawayama |
| 6,049,317 A | 4/2000 | Thompson et al. |
| 6,055,090 A | 4/2000 | Miles |
| 6,072,620 A | 6/2000 | Shiono |
| 6,073,034 A | 6/2000 | Jacobsen |
| 6,074,069 A | 6/2000 | Chao-Ching |
| 6,091,469 A | 7/2000 | Naito |
| 6,099,134 A | 8/2000 | Taniguchi |
| 6,195,196 B1 | 2/2001 | Kimura |
| 6,196,691 B1 | 3/2001 | Ochiai |
| 6,211,976 B1 | 4/2001 | Popovich |
| 6,213,606 B1 | 4/2001 | Holman |
| 6,232,937 B1 | 5/2001 | Jacobsen |
| 6,243,149 B1 | 6/2001 | Swanson et al. |
| 6,259,082 B1 | 7/2001 | Fujimoto et al. |
| 6,282,010 B1 | 8/2001 | Sulzbach |
| 6,322,236 B1 | 11/2001 | Campbell et al. |
| 6,323,415 B1 | 11/2001 | Uematsu et al. |
| 6,323,987 B1 | 11/2001 | Rinaudo |
| 6,356,378 B1 | 3/2002 | Huibers |
| 6,375,327 B2 | 4/2002 | Holman |
| 6,377,535 B1 | 4/2002 | Chen et al. |
| 6,381,022 B1 | 4/2002 | Zavracky |
| 6,402,325 B1 | 6/2002 | Yamamoto |
| 6,412,969 B1 | 7/2002 | Torihara |
| 6,421,103 B2 | 7/2002 | Yamaguchi |
| 6,442,124 B1 | 8/2002 | Chung et al. |
| 6,454,452 B1 | 9/2002 | Sasagawa |
| 6,478,432 B1 | 11/2002 | Dyner |
| 6,480,634 B1 | 11/2002 | Corrigan |
| 6,483,613 B1 | 11/2002 | Woodgate et al. |
| 6,493,475 B1 | 12/2002 | Lin |
| 6,520,643 B1 | 2/2003 | Holman et al. |
| 6,522,794 B1 | 2/2003 | Bischel |
| 6,527,410 B2 | 3/2003 | Yamaguchi |
| 6,538,813 B1 | 3/2003 | Magno |
| 6,574,033 B1 | 6/2003 | Chui |
| 6,577,429 B1 | 6/2003 | Kurtz |
| 6,582,095 B1 | 6/2003 | Toyoda |
| 6,592,234 B2 | 7/2003 | Epstein |
| 6,598,987 B1 | 7/2003 | Parikka |
| 6,603,520 B2 | 8/2003 | Umemoto |
| 6,630,968 B1 | 10/2003 | Tsuchihashi et al. |
| 6,631,998 B2 | 10/2003 | Egawa et al. |
| 6,636,322 B1 | 10/2003 | Terashita |
| 6,636,358 B2 | 10/2003 | Umemoto et al. |
| 6,642,913 B1 | 11/2003 | Kimura |
| 6,643,067 B2 | 11/2003 | Miyamae |
| 6,646,772 B1 | 11/2003 | Popovich et al. |
| 6,650,455 B2 | 11/2003 | Miles |
| 6,652,109 B2 | 11/2003 | Nakamura |
| 6,669,350 B2 | 12/2003 | Yamashita |
| 6,674,562 B1 | 1/2004 | Miles |
| 6,680,792 B2 | 1/2004 | Miles |
| 6,693,690 B2 | 2/2004 | Umemoto |
| 6,696,140 B2 | 2/2004 | Suzuki |
| 6,709,123 B2 | 3/2004 | Flohr |
| 6,738,194 B1 | 5/2004 | Ramirez |
| 6,742,921 B2 | 6/2004 | Umemoto |
| 6,751,023 B2 | 6/2004 | Umemoto et al. |
| 6,760,135 B1 | 7/2004 | Payne |
| 6,761,461 B2 | 7/2004 | Mizutani et al. |
| 6,773,126 B1 | 8/2004 | Hatjasalo |
| 6,774,962 B2 | 8/2004 | Yoon |
| 6,784,948 B2 | 8/2004 | Kawashima et al. |
| 6,794,119 B2 | 9/2004 | Miles |
| 6,798,469 B2 | 9/2004 | Kimura |
| 6,819,380 B2 | 11/2004 | Wen et al. |
| 6,822,745 B2 | 11/2004 | De Groot et al. |
| 6,826,000 B2 | 11/2004 | Lee et al. |
| 6,841,787 B2 | 1/2005 | Almogy |
| 6,852,396 B1 | 2/2005 | Mineo |
| 6,862,141 B2 | 3/2005 | Olczak |
| 6,866,393 B2 | 3/2005 | Yano et al. |
| 6,871,982 B2 | 3/2005 | Holman et al. |
| 6,879,354 B1 | 4/2005 | Sawayama |
| 6,885,377 B2 | 4/2005 | Lim |
| 6,917,469 B2 | 7/2005 | Momose |
| 6,930,816 B2 | 8/2005 | Mochizuki |
| 6,940,653 B2 | 9/2005 | Favalora et al. |
| 6,964,484 B2 | 11/2005 | Gupta |
| 6,967,779 B2 | 11/2005 | Fadel et al. |
| 6,970,031 B1 | 11/2005 | Martin |
| 6,998,196 B2 | 2/2006 | Rich et al. |
| 6,999,235 B2 | 2/2006 | Nakamura |
| 7,002,726 B2 | 2/2006 | Patel |
| 7,004,610 B2 | 2/2006 | Yamashita |
| 7,009,754 B2 | 3/2006 | Huibers |
| 7,012,659 B2 | 3/2006 | Smith et al. |
| 7,018,088 B2 | 3/2006 | Yu |
| 7,019,734 B2 | 3/2006 | Cross et al. |
| 7,025,461 B2 | 4/2006 | Veligdan |
| 7,030,949 B2 | 4/2006 | Kashima |
| 7,038,752 B2 | 5/2006 | Lin |
| 7,041,344 B2 | 5/2006 | Kusume et al. |
| 7,042,643 B2 | 5/2006 | Miles |
| 7,046,409 B2 | 5/2006 | Kihara |
| 7,054,045 B2 | 5/2006 | McPheters |
| 7,056,001 B2 | 6/2006 | Chuang |
| 7,064,875 B2 | 6/2006 | Kawano |
| 7,068,948 B2 | 6/2006 | Wei et al. |
| 7,072,093 B2 | 7/2006 | Piehl |
| 7,072,096 B2 | 7/2006 | Holman et al. |
| 7,092,163 B2 | 8/2006 | Bastawros et al. |
| 7,099,058 B2 | 8/2006 | Takemori et al. |
| 7,110,158 B2 | 9/2006 | Miles |
| 7,113,339 B2 | 9/2006 | Taguchi et al. |
| 7,123,216 B1 | 10/2006 | Miles |
| 7,138,984 B1 | 11/2006 | Miles |

| | | | | | |
|---|---|---|---|---|---|
| 7,142,347 B2 | 11/2006 | Islam | 2003/0103177 A1 | 6/2003 | Maeda |
| 7,156,546 B2 | 1/2007 | Higashiyama | 2003/0151821 A1 | 8/2003 | Favalora |
| 7,161,730 B2 | 1/2007 | Floyd | 2003/0160919 A1 | 8/2003 | Suzuki |
| 7,210,806 B2 | 5/2007 | Holman | 2003/0161040 A1 | 8/2003 | Ishii |
| 7,218,429 B2 | 5/2007 | Batchko | 2003/0169385 A1 | 9/2003 | Okuwaki |
| 7,221,418 B2 | 5/2007 | Lee | 2003/0184690 A1 | 10/2003 | Ogiwara |
| 7,223,010 B2 | 5/2007 | Min | 2003/0193630 A1 | 10/2003 | Chiou |
| 7,262,916 B2 | 8/2007 | Kao | 2003/0210222 A1 | 11/2003 | Ogiwara et al. |
| 7,324,248 B2 | 1/2008 | Brotherton-Ratcliffe et al. | 2003/0210363 A1 | 11/2003 | Yasukawa |
| 7,327,510 B2 | 2/2008 | Cummings et al. | 2003/0214728 A1 | 11/2003 | Olczak |
| 7,336,329 B2 | 2/2008 | Yoon | 2003/0222857 A1 | 12/2003 | Abileah |
| 7,342,705 B2 | 3/2008 | Chui et al. | 2003/0231483 A1 | 12/2003 | Higashiyama |
| 7,342,709 B2 | 3/2008 | Lin | 2004/0027315 A1 | 2/2004 | Senda et al. |
| 7,352,501 B2 | 4/2008 | Chopra et al. | 2004/0027339 A1 | 2/2004 | Schulz |
| 7,359,011 B2 | 4/2008 | Hamada | 2004/0032401 A1 | 2/2004 | Nakazawa |
| 7,360,899 B2 | 4/2008 | McGuire | 2004/0032659 A1 | 2/2004 | Drinkwater |
| 7,366,393 B2 | 4/2008 | Cassarly | 2004/0070711 A1 | 4/2004 | Wen |
| 7,369,292 B2 | 5/2008 | Xu et al. | 2004/0080938 A1 | 4/2004 | Holman |
| 7,369,294 B2 | 5/2008 | Gally | 2004/0125048 A1 | 7/2004 | Fukuda |
| 7,376,308 B2 | 5/2008 | Cheben et al. | 2004/0174583 A1 | 9/2004 | Chen et al. |
| 7,380,970 B2 | 6/2008 | Hwang | 2004/0188150 A1 | 9/2004 | Richard et al. |
| 7,388,181 B2 | 6/2008 | Han et al. | 2004/0188599 A1 | 9/2004 | Viktorovitch |
| 7,400,439 B2 | 7/2008 | Holman | 2004/0207995 A1 | 10/2004 | Park |
| 7,403,180 B1 | 7/2008 | Silverstein et al. | 2004/0217264 A1 | 11/2004 | Wood |
| 7,417,735 B2 | 8/2008 | Cummings | 2004/0233357 A1 | 11/2004 | Fujimori |
| 7,417,784 B2 | 8/2008 | Sasagawa | 2004/0246743 A1 | 12/2004 | Lee et al. |
| 7,450,295 B2 | 11/2008 | Tung | 2005/0002082 A1 | 1/2005 | Miles |
| 7,456,805 B2 | 11/2008 | Ouderkirk | 2005/0010568 A1 | 1/2005 | Nagatomo |
| 7,498,621 B2 | 3/2009 | Seitz | 2005/0024849 A1 | 2/2005 | Parker |
| 7,502,168 B2 | 3/2009 | Akutsu et al. | 2005/0041175 A1 | 2/2005 | Akiyama |
| 7,508,571 B2 | 3/2009 | Gally | 2005/0069254 A1 | 3/2005 | Schultheis |
| 7,520,642 B2 | 4/2009 | Holman et al. | 2005/0120553 A1 | 6/2005 | Brown |
| 7,561,323 B2 | 7/2009 | Gally | 2005/0133761 A1 | 6/2005 | Thielemans |
| 7,564,612 B2 | 7/2009 | Chui | 2005/0141065 A1 | 6/2005 | Masamoto |
| 7,603,001 B2 | 10/2009 | Wang | 2005/0146897 A1 | 7/2005 | Mimura |
| 7,630,123 B2 | 12/2009 | Kothari | 2005/0206802 A1 | 9/2005 | Creemers |
| 7,643,203 B2 | 1/2010 | Gousev et al. | 2005/0207016 A1 | 9/2005 | Ando |
| 7,663,714 B2 | 2/2010 | Haga et al. | 2005/0231977 A1 | 10/2005 | Hayakawa |
| 7,688,494 B2 | 3/2010 | Xu et al. | 2005/0259939 A1 | 11/2005 | Rinko |
| 7,706,050 B2 | 4/2010 | Sampsell | 2005/0286113 A1 | 12/2005 | Miles |
| 7,710,636 B2 | 5/2010 | Chui | 2006/0001942 A1 | 1/2006 | Chui |
| 7,733,439 B2 | 6/2010 | Sampsell | 2006/0002141 A1 | 1/2006 | Ouderkirk |
| 7,750,886 B2 | 7/2010 | Sampsell | 2006/0051048 A1 | 3/2006 | Gardiner |
| 7,777,954 B2 | 8/2010 | Gruhlke | 2006/0056166 A1 | 3/2006 | Yeo et al. |
| 7,813,026 B2 | 10/2010 | Sampsell | 2006/0062016 A1 | 3/2006 | Dejima |
| 7,813,029 B2 | 10/2010 | Kothari et al. | 2006/0066541 A1 | 3/2006 | Gally |
| 7,845,841 B2 | 12/2010 | Sampsell | 2006/0066586 A1 | 3/2006 | Gally |
| 7,855,827 B2 | 12/2010 | Xu et al. | 2006/0066935 A1 | 3/2006 | Cummings |
| 7,859,731 B2 | 12/2010 | Choi | 2006/0067600 A1 | 3/2006 | Gally |
| 7,864,395 B2 | 1/2011 | Chui | 2006/0077123 A1* | 4/2006 | Gally et al. ............. 345/32 |
| 7,876,397 B2 | 1/2011 | Krijn et al. | 2006/0077124 A1 | 4/2006 | Gally |
| 7,880,954 B2 | 2/2011 | Sampsell | 2006/0109682 A1 | 5/2006 | Ko et al. |
| 7,907,319 B2 | 3/2011 | Miles | 2006/0126142 A1 | 6/2006 | Choi |
| 7,933,475 B2 | 4/2011 | Wang | 2006/0132383 A1 | 6/2006 | Gally |
| 7,944,602 B2 | 5/2011 | Chui | 2006/0181903 A1 | 8/2006 | Okuwaki |
| 8,111,446 B2 | 2/2012 | Gally et al. | 2006/0209012 A1 | 9/2006 | Hagood, IV |
| 2001/0003504 A1 | 6/2001 | Ishihara | 2006/0209385 A1 | 9/2006 | Liu |
| 2001/0019380 A1 | 9/2001 | Ishihara | 2006/0215958 A1 | 9/2006 | Yeo |
| 2001/0019479 A1 | 9/2001 | Nakabayashi | 2006/0227532 A1 | 10/2006 | Ko et al. |
| 2001/0026001 A1 | 10/2001 | Yagi | 2006/0262562 A1 | 11/2006 | Fukasawa |
| 2001/0030861 A1 | 10/2001 | Oda | 2006/0274400 A1 | 12/2006 | Miles |
| 2001/0049061 A1 | 12/2001 | Nakagaki | 2006/0279558 A1 | 12/2006 | Van Delden et al. |
| 2001/0055208 A1 | 12/2001 | Kimura | 2006/0291769 A1 | 12/2006 | Spoonhower et al. |
| 2002/0034071 A1 | 3/2002 | Mabuchi | 2007/0018585 A1 | 1/2007 | Ijzerman et al. |
| 2002/0054258 A1 | 5/2002 | Kondo | 2007/0036492 A1 | 2/2007 | Lee |
| 2002/0075245 A1 | 6/2002 | Kawashima | 2007/0064294 A1 | 3/2007 | Hoshino et al. |
| 2002/0075555 A1 | 6/2002 | Miles | 2007/0070270 A1 | 3/2007 | Yu et al. |
| 2002/0080465 A1 | 6/2002 | Han | 2007/0097694 A1 | 5/2007 | Faase |
| 2002/0105699 A1 | 8/2002 | Miracky | 2007/0125415 A1 | 6/2007 | Sachs |
| 2002/0106182 A1 | 8/2002 | Kawashima | 2007/0133935 A1 | 6/2007 | Fine |
| 2002/0135560 A1 | 9/2002 | Akaoka | 2007/0134438 A1 | 6/2007 | Fabick |
| 2002/0149584 A1 | 10/2002 | Simpson | 2007/0171330 A1 | 7/2007 | Hung |
| 2002/0154256 A1 | 10/2002 | Gotoh | 2007/0201234 A1 | 8/2007 | Ottermann |
| 2002/0172039 A1 | 11/2002 | Inditsky | 2007/0229737 A1 | 10/2007 | Takeda |
| 2003/0016930 A1 | 1/2003 | Inditsky | 2007/0229936 A1 | 10/2007 | Miles |
| 2003/0067760 A1 | 4/2003 | Jagt | 2007/0253054 A1 | 11/2007 | Miles |
| 2003/0081154 A1 | 5/2003 | Coleman | 2007/0279727 A1 | 12/2007 | Gandhi |
| 2003/0083429 A1 | 5/2003 | Smith | 2007/0279935 A1 | 12/2007 | Gardiner |
| 2003/0095401 A1 | 5/2003 | Hanson | 2007/0291362 A1 | 12/2007 | Hill et al. |

| | | | | | | |
|---|---|---|---|---|---|---|
| 2008/0030650 | A1 | 2/2008 | Kitagawa | GB | 2 278 222 | 11/1994 |
| 2008/0042154 | A1 | 2/2008 | Wano | GB | 2 315 356 | 1/1998 |
| 2008/0084600 | A1 | 4/2008 | Bita et al. | GB | 2 340 281 | 2/2000 |
| 2008/0112039 | A1 | 5/2008 | Chui | JP | 62 009317 | 1/1987 |
| 2008/0137175 | A1 | 6/2008 | Lin | JP | 04 081816 | 3/1992 |
| 2008/0151347 | A1 | 6/2008 | Chui | JP | U04-053220 | 5/1992 |
| 2008/0192484 | A1 | 8/2008 | Lee | JP | 05 281479 | 10/1993 |
| 2008/0239216 | A1 | 10/2008 | Miyamoto | JP | 07-509327 | 10/1995 |
| 2008/0266333 | A1 | 10/2008 | Silverstein et al. | JP | 08 271874 | 10/1996 |
| 2009/0059346 | A1 | 3/2009 | Xu | JP | 09 005735 | 1/1997 |
| 2009/0086466 | A1 | 4/2009 | Sugita | JP | 09 022012 | 1/1997 |
| 2009/0096956 | A1 | 4/2009 | Uehara et al. | JP | 09-507920 | 8/1997 |
| 2009/0097100 | A1 | 4/2009 | Gally | JP | 09 307140 | 11/1997 |
| 2009/0101623 | A1 | 4/2009 | Bita et al. | JP | 10 500224 | 1/1998 |
| 2009/0103166 | A1 | 4/2009 | Khazeni et al. | JP | 10 202948 | 8/1998 |
| 2009/0126792 | A1 | 5/2009 | Gruhlke | JP | 11 160687 | 6/1999 |
| 2009/0147332 | A1 | 6/2009 | Bita et al. | JP | 11 174234 | 7/1999 |
| 2009/0147535 | A1 | 6/2009 | Mienko | JP | 11 184387 | 7/1999 |
| 2009/0190373 | A1 | 7/2009 | Bita et al. | JP | 11 211999 | 8/1999 |
| 2009/0199893 | A1 | 8/2009 | Bita | JP | 11 232919 | 8/1999 |
| 2009/0199900 | A1 | 8/2009 | Bita | JP | 11 326903 | 11/1999 |
| 2009/0201565 | A1 | 8/2009 | Bita et al. | JP | 2000 500245 | 1/2000 |
| 2009/0201571 | A1 | 8/2009 | Gally | JP | 2000-089225 | 3/2000 |
| 2009/0231877 | A1 | 9/2009 | Mienko | JP | 2000 147262 | 5/2000 |
| 2009/0255569 | A1 | 10/2009 | Sampsell | JP | 2000 514568 | 10/2000 |
| 2009/0257108 | A1 | 10/2009 | Gruhlke | JP | 2000 305074 | 11/2000 |
| 2009/0296194 | A1 | 12/2009 | Gally | JP | 2000 338310 | 12/2000 |
| 2009/0303417 | A1 | 12/2009 | Mizushima et al. | JP | 2001-297615 | 10/2001 |
| 2009/0310208 | A1 | 12/2009 | Wang | JP | 2001 305312 | 10/2001 |
| 2009/0323144 | A1 | 12/2009 | Gruhlke | JP | 2001 343514 | 12/2001 |
| 2009/0323153 | A1 | 12/2009 | Sampsell | JP | 2002 090549 | 3/2002 |
| 2010/0026727 | A1 | 2/2010 | Bita et al. | JP | 2002-124113 | 4/2002 |
| 2010/0052880 | A1 | 3/2010 | Laitinen et al. | JP | 2002-131551 | 5/2002 |
| 2010/0103488 | A1 | 4/2010 | Gruhlke et al. | JP | 2002 174780 | 6/2002 |
| 2010/0141557 | A1 | 6/2010 | Gruhlke | JP | 2002-236290 | 8/2002 |
| 2010/0149624 | A1 | 6/2010 | Kothari | JP | 2002 287047 | 10/2002 |
| 2010/0165443 | A1 | 7/2010 | Chui | JP | 2002-297044 | 10/2002 |
| 2010/0172012 | A1 | 7/2010 | Sampsell | JP | 2003 057652 | 2/2003 |
| 2010/0238529 | A1 | 9/2010 | Sampsell et al. | JP | 2003 066451 | 3/2003 |
| 2010/0302802 | A1 | 12/2010 | Bita | JP | 2003-149642 | 5/2003 |
| 2011/0025727 | A1 | 2/2011 | Li | JP | 2003-149643 | 5/2003 |
| | | | | JP | 2003 177336 | 6/2003 |
| FOREIGN PATENT DOCUMENTS | | | | JP | 2003-177405 | 6/2003 |
| | | | | JP | 2003 188959 | 7/2003 |
| CN | 1286424 | | 3/2001 | JP | 2004-012918 | 1/2004 |
| CN | 1447887 | | 10/2003 | JP | 2004-062099 | 2/2004 |
| CN | 1639596 | A | 7/2005 | JP | 2004-510185 | 4/2004 |
| CN | 1643439 | A | 7/2005 | JP | 2004-206049 | 7/2004 |
| CN | 1755494 | A | 4/2006 | JP | 2005-316178 | 11/2005 |
| CN | 1795403 | A | 6/2006 | JP | 2006-039056 | 2/2006 |
| CN | 1811549 | | 8/2006 | JP | 2006-065360 A | 3/2006 |
| DE | 34 02 746 | | 8/1985 | JP | 2007 027150 | 2/2007 |
| DE | 196 22 748 | | 12/1997 | JP | 2007-218540 A | 8/2007 |
| DE | 102 28 946 | | 1/2004 | TW | 567388 | 12/2003 |
| EP | 0 278 038 | | 8/1988 | WO | WO 94/06871 A1 | 3/1994 |
| EP | 0 590 511 | | 4/1994 | WO | WO 95/01584 | 1/1995 |
| EP | 0 822 441 | | 2/1998 | WO | WO 95/14256 | 5/1995 |
| EP | 0 879 991 | | 11/1998 | WO | WO 95/15582 A1 | 6/1995 |
| EP | 0 907 050 | | 4/1999 | WO | WO 95/30924 | 11/1995 |
| EP | 0 957 392 | | 11/1999 | WO | WO 97/01240 | 1/1997 |
| EP | 1 081 633 | | 3/2001 | WO | WO 97/16756 | 5/1997 |
| EP | 1 089 115 | | 4/2001 | WO | WO 97/17628 | 5/1997 |
| EP | 1 122 586 | | 8/2001 | WO | WO 97/46908 | 12/1997 |
| EP | 1 143 270 | | 10/2001 | WO | WO 98/14828 | 4/1998 |
| EP | 1 199 512 | | 4/2002 | WO | WO 98/19201 | 5/1998 |
| EP | 1 251 454 | | 10/2002 | WO | WO 98/32047 | 7/1998 |
| EP | 1 271 223 | | 1/2003 | WO | WO 98/35182 | 8/1998 |
| EP | 1 279 892 | | 1/2003 | WO | WO 99/04296 A | 1/1999 |
| EP | 1 296 094 | | 3/2003 | WO | WO 99/63394 | 12/1999 |
| EP | 1 329 664 | | 7/2003 | WO | WO 00/50807 | 8/2000 |
| EP | 1 336 876 | | 8/2003 | WO | WO 01/57434 | 8/2001 |
| EP | 1 347 315 | | 9/2003 | WO | WO 01/81994 | 11/2001 |
| EP | 1 389 775 | | 2/2004 | WO | WO 01/84229 | 11/2001 |
| EP | 1 413 543 | | 4/2004 | WO | WO 01/90637 | 11/2001 |
| EP | 1 437 610 | | 7/2004 | WO | WO 02/06858 | 1/2002 |
| EP | 1 519 218 | | 3/2005 | WO | WO 02/071132 | 9/2002 |
| EP | 1 544 537 | | 6/2005 | WO | WO 03/032058 | 4/2003 |
| EP | 1 577 701 | | 9/2005 | WO | WO 03/038509 | 5/2003 |
| EP | 1 734 401 | | 12/2006 | WO | WO 03/056876 | 7/2003 |
| GB | 2 260 203 | | 4/1993 | | | |

| | | |
|---|---|---|
| WO | WO 03/062912 | 7/2003 |
| WO | WO 03/075207 | 9/2003 |
| WO | WO 2004/006003 | 1/2004 |
| WO | WO 2004/027514 | 4/2004 |
| WO | WO 2004/036270 | 4/2004 |
| WO | WO 2004/068182 | 8/2004 |
| WO | WO 2004/114418 A1 | 12/2004 |
| WO | WO 2005/011012 | 2/2005 |
| WO | WO 2005/088367 | 9/2005 |
| WO | WO 2006/036496 | 4/2006 |
| WO | WO 2007/073203 A1 | 6/2007 |
| WO | WO 2007/094558 | 8/2007 |
| WO | WO 2008/045207 | 4/2008 |
| WO | WO 2008/045218 | 4/2008 |
| WO | WO 2008/045311 | 4/2008 |
| WO | WO 2008/045364 | 4/2008 |
| WO | WO 2008/045462 | 4/2008 |
| WO | WO 2008/045463 | 4/2008 |

OTHER PUBLICATIONS

International Preliminary Report on Patentability for Application No. PCT/US2007/021623, dated May 4, 2009.

International Search Report and Written Opinion in International Application No. PCT/US2007/021622 dated Oct. 22, 2008.

International Preliminary Report on Patentability in International Application No. PCT/US2007/021622 dated May 4, 2009.

Fan et al. "Channel Drop Filters in Photonic Crystals", Optics Express, vol. 3, No. 1, pp. 4-11, 1998.

Giles et al. "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.

Goosen, "MEMS-Based Variable Optical Interference Devices", IEEE/LEOS International Conference on Optical MEMS, pp. 17-18, Aug. 2000.

Imenes et al. "Spectral beam splitting technology for increased conversion efficiency in solar concentrating systems: a review" Solar Energy Materials, Elsevier Science Publishers B.V. Amsterdam, NL, vol. 84, Oct. 1, 2004, pp. 19-69, XP002474546.

Little et al. "Vertically Coupled Microring Rosonator Channel Dropping Filter", IEEE Photonics Technology Letters, vol. 11, No. 2, pp. 215-217, 1999.

Magel, "Integrated Optic Devices Using Micromachined Metal Membranes", SPIE vol. 2686, 0-8194-2060-3, pp. 54-63, 1996.

Mehregany et al., "MEMS applications in Optical Systems," IEEE/LEOS 1996 Summer Topical Meetings, pp. 75-76, Aug. 1996.

Miles, M. et al., "Digital Paper™ for reflective displays," Journal of the Society for Information Display, Society for Information Display, San Jose, US, vol. 11, No. 1, pp. 209-215, 2003.

Neal T.D. et al. "Surface Plasmon enhanced emission from dye doped polymer layers," Optics Express Opt. Soc. America, USA, vol. 13, No. 14, pp. 5522-5527, Jul. 11, 2005.

Obi et al. Fabrication of Optical MEMS in SOL-GEL Materials; IEEE/LEOS International Conference on Optical MEMS, pp. 39-40, Aug. 2002.

Oliner, "Radiating Elements and Mutual Coupling," Microwave Scanning Antennas, vol. 2, pp. 131-157 and pp. 190-194, 1966.

Zhou et al. "Waveguide Panel Display Using Electromechanical Spatial Modulators" SID Digest, vol. XXIX, 1998.

Office Action in U.S. Appl. No. 12/444,683 dated Feb. 9, 2012.

Amendment in U.S. Appl. No. 12/444,683 dated May 8, 2012.

Office Action in U.S. Appl. No. 12/444,683 dated Jun. 14, 2012.

* cited by examiner

| | Column Output Signals | |
|---|---|---|
| | +$V_{bias}$ | -$V_{bias}$ |
| 0 | Stable | Stable |
| +Δ$V$ | Relax | Actuate |
| -Δ$V$ | Actuate | Relax |

Row Output Signals

DISPLAY DEVICE WITH DIFFRACTIVE OPTICS

This application is a continuation of PCT/US2007/021623, filed Oct. 9, 2007, entitled "DISPLAY DEVICE WITH DIFFRACTIVE OPTICS," which was published in English and designated the U.S., and claims priority to U.S. Provisional Application Ser. No. 60/850,759, filed Oct. 10, 2006, entitled "INTERFEROMETRIC MODULATOR DISPLAY DEVICE WITH A HOLOGRAPHIC LAYER," each of which is incorporated herein by reference.

BACKGROUND

1. Field of the Invention

The field relates to display systems.

2. Description of the Related Technology

Display systems may include light modulators to produce a displayed image by modulating light directed to the light modulators. Such display systems may include a source of illumination to at least partly provide light to the light modulators. One embodiment of a light modulator comprises microelectromechanical systems (MEMS). Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed. For example, a need exists for improved illumination sources for light modulator based displays.

SUMMARY OF CERTAIN INVENTIVE ASPECTS

One aspect is an illumination apparatus having front and rear surfaces, the illumination apparatus including a plurality of holographic features between the front and rear surfaces, the front surface being forward the holographic features and the rear surface being rearward the holographic features, a first light guide forward the holographic features, and a second light guide rearward the holographic features. The first and second light guides are each configured to guide light therein, and the holographic features are configured to turn at least a portion of the light from each of the first and second light guides, such that the turned portions of light exit the apparatus through the rear surface.

Another aspect is a illumination apparatus having front and rear surfaces, the illumination apparatus including holographic means for diffracting light between the front and rear surfaces, the front surface being forward the diffracting means and the rear surface being rearward the diffracting means, first means for guiding light disposed forward the diffracting means, and second means for guiding light disposed rearward the diffracting means. The first and second light guiding means are each configured to guide light therein, and the diffracting means are configured to turn at least a portion of the light from each of the first and second light guiding means, such that the turned portions of light exit the apparatus through the rear surface.

Another aspect is a method of manufacturing an illumination apparatus having front and rear surfaces, the method including disposing a plurality of holographic features between the front and rear surfaces, the front surface being forward the holographic features and the rear surface being rearward the holographic features, disposing a first light guide forward the holographic features, and disposing a second light guide rearward the holographic features. The first and second light guides are each configured to guide light therein, and the holographic features are configured to turn at least a portion of the light from each of the first and second light guides, such that the turned portions of light exit the apparatus through the rear surface.

Another aspect is a method of using a multilayer stack having front and rear surfaces, the method including guiding light in a first light guide forward a plurality of holographic features, the holographic features between the front and rear surfaces, the front surface being forward the holographic features and the rear surface being rearward the holographic features, guiding light in a second light guide rearward the holographic features, and with the holographic features, turning at least a portion of the light from each of the first and second light guides, such that the turned portions of light exit the apparatus through the rear surface.

Another aspect is an illumination apparatus, the apparatus including a light guide having first and second ends, such that light injected into the first end is guided toward the second end via total internal reflection, and diffractive optics disposed to receive light guided within the light guide and configured turn a portion of the guided light out of the light guide. The diffractive optics are further configured to collect ambient light incident thereon and collimate the ambient light, where the diffractive optics includes at least one holographic element.

Another aspect is an illumination apparatus, the apparatus including means for guiding light having first and second ends, such that light injected into the first end is guided toward the second end via total internal reflection, and means for diffracting light disposed to receive light guided within the light guiding means and configured to turn a portion of the guided light out of the light guiding means. The light diffracting means is further configured to collimate ambient light incident thereon, where the light diffracting means diffracts light holographically.

Another aspect is a method of manufacturing an illumination apparatus, the method including providing a light guide having first and second ends, such that light injected into the first end is guided toward the second end via total internal reflection, and disposing diffractive optics to receive light guided within the light guide and configured turn a portion of the guided light out of the light guide. The diffractive optics is further configured to collimate the ambient light, where the diffractive optics includes at least one holographic element.

Another aspect is an illumination apparatus, the apparatus including a light guide having first and second ends and forward and rearward surfaces, the light guide adapted such that light injected into the first end is guided between the forward and rearward surfaces toward the second end via total internal reflection, and at diffractive optics disposed to receive light guided within the light guide and configured turn a portion of the guided light out of the light guide through the rearward surface, the diffractive optics further configured to diffuse light that enters the light guide through the rearward surface and exits the light guide through the forward surface, where the diffractive optics includes at least one holographic element.

Another aspect is an illumination apparatus, the apparatus including means for guiding light having first and second ends and forward and rearward surfaces, the light guiding means adapted such that light injected into the first end is guided between the forward and rearward surfaces toward the second end via total internal reflection, and means for diffracting light. The diffracting means is configured to receive light guided within the light guiding means and turn a portion of the guided light out of the light guiding means through the rearward surface. The light diffracting means is further configured to diffuse light that enters the light guiding means through the rearward surface and exits the light guiding means through the forward surface, where the light diffracting means diffracts light holographically.

Another aspect is a method of manufacturing an illumination apparatus, the method including providing a light guide having first and second ends and forward and rearward surfaces, the light guide adapted such that light injected into the first end is guided between the forward and rearward surfaces toward the second end via total internal reflection, and disposing diffractive optics to receive light guided within the light guide and turn a portion of the guided light out of the light guide through the rearward surface, the diffractive optics configured to diffuse light that enters the light guide through the rearward surface and exists the light guide through the forward surface, where the diffractive optics includes at least one holographic element.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Light modulator displays may be illuminated using a light guide that illuminate the array of light modulators. The light guide may comprise diffractive optics that manipulates light and redirects the light onto the light modulators. The diffractive optics may have multiple functions, such as for example, collimating or diffusing light.

In one embodiment, the diffractive optics comprises a holographic turning layer positioned between the array and the user. A light source is located to the side of the array and is configured to inject light into the light guide. The light guide guides the light across the front of the array of light modulators. The holographic turning element redirects the light propagating across the light guide to the array. In some embodiments, the holographic layer may also collimate or diffuse. Other embodiments are also disclosed herein.

Figure 1:
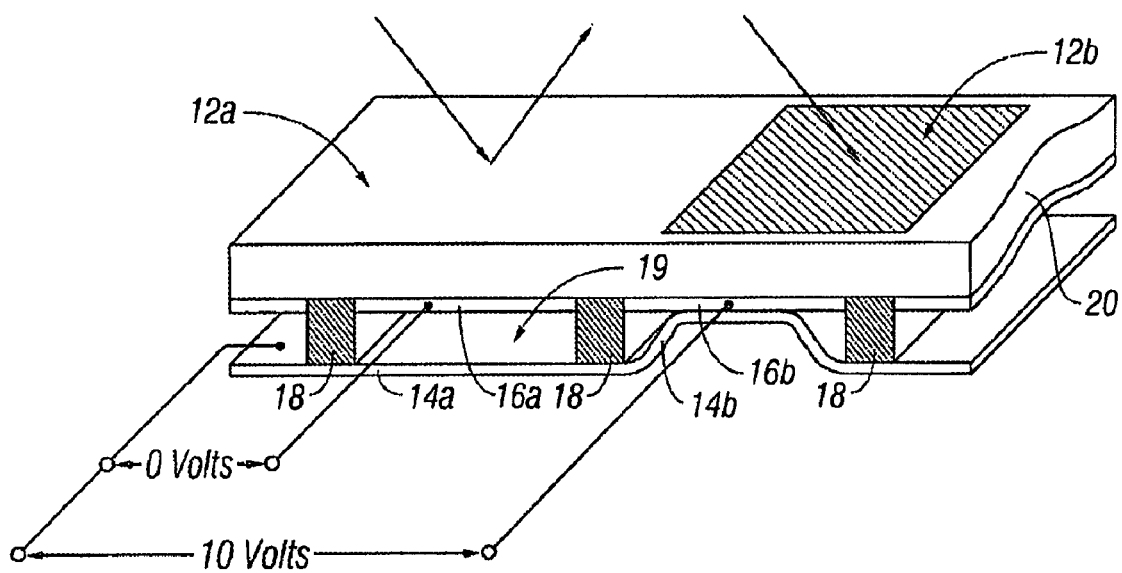
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this FIG.) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
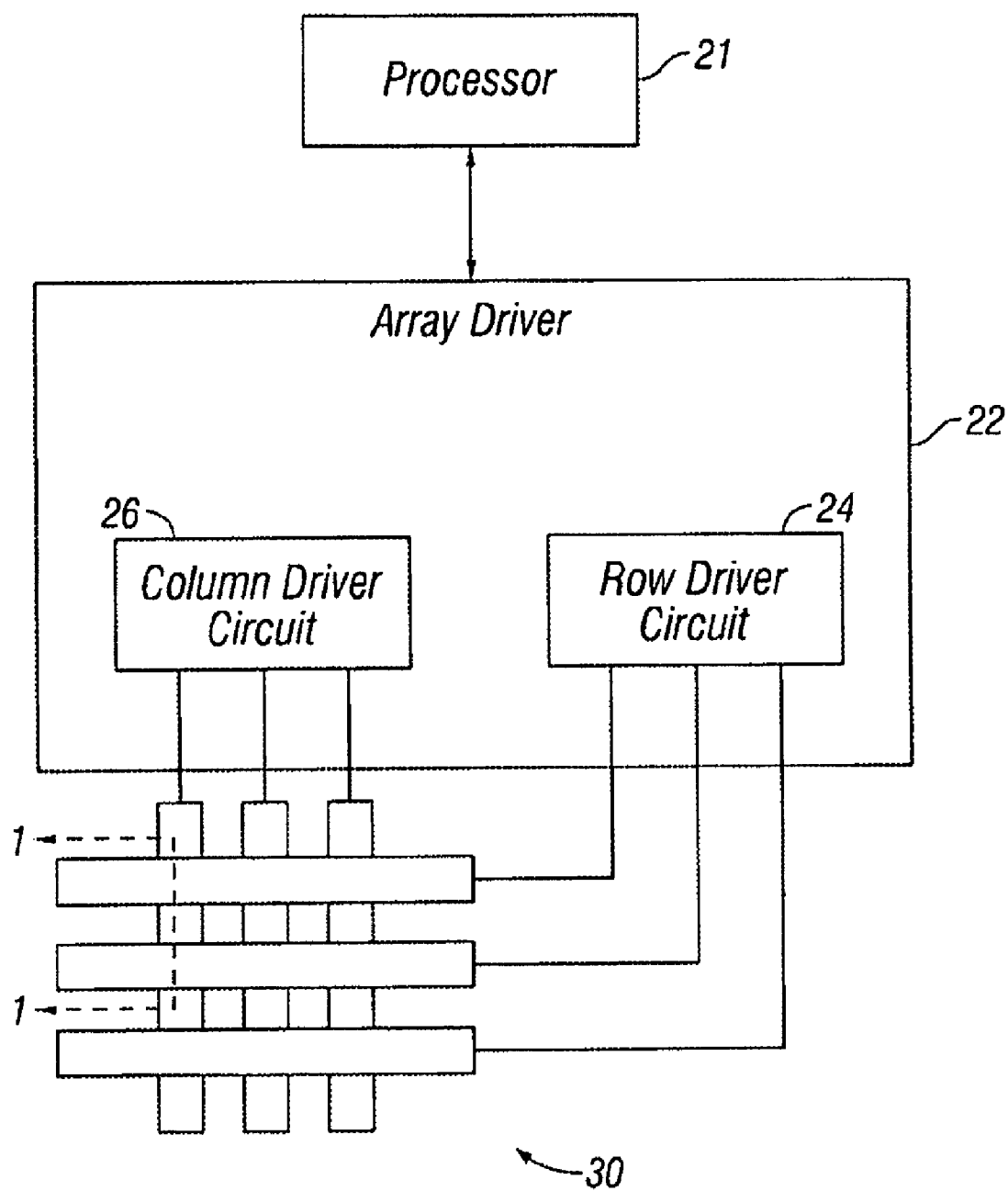
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
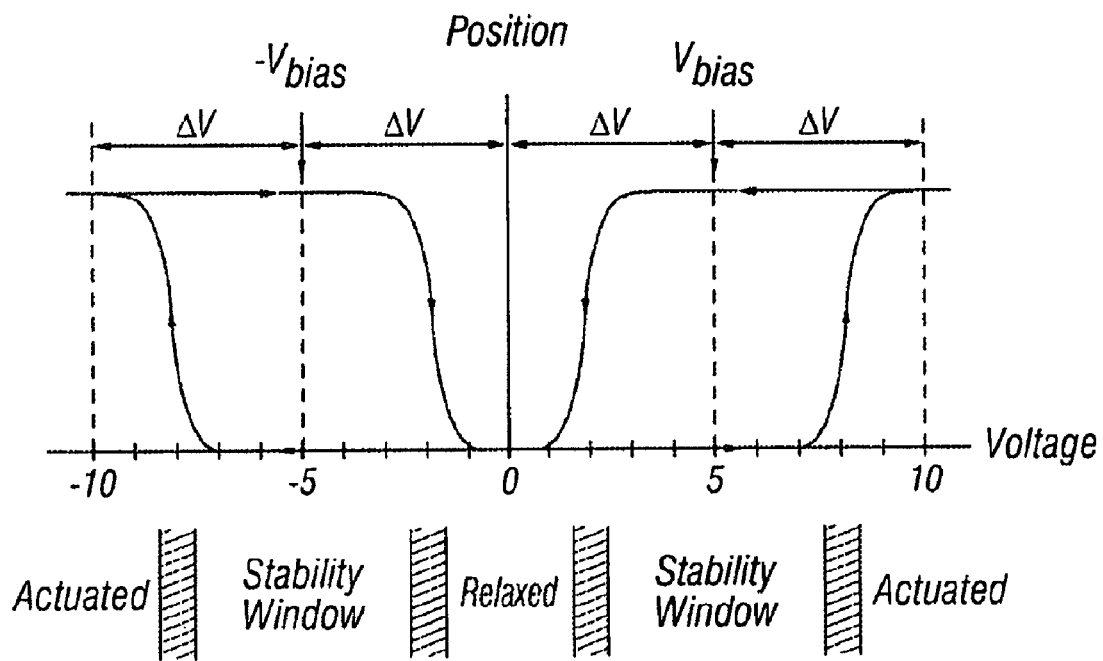
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
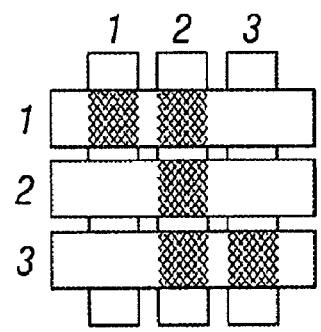
FIGS. 5A and 5B illustrate one exemplary timing diagram for row and column signals that may be used to write a frame of display data to the 3×3 interferometric modulator display of FIG. 2.
Figure 5B:
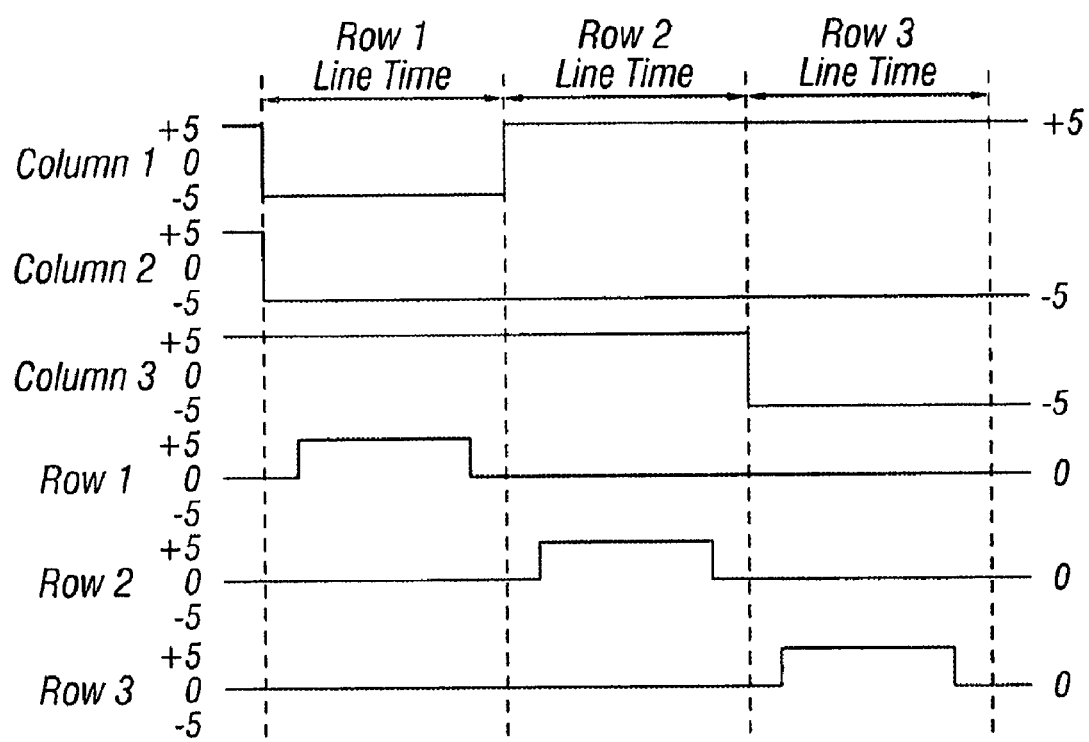

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
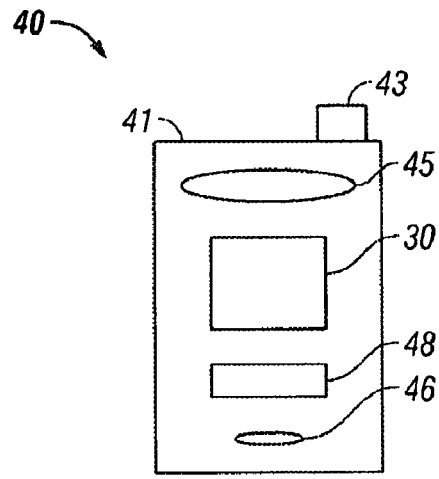
FIGS. 6A and 6B are system block diagrams illustrating an embodiment of a visual display device comprising a plurality of interferometric modulators.
Figure 6B:
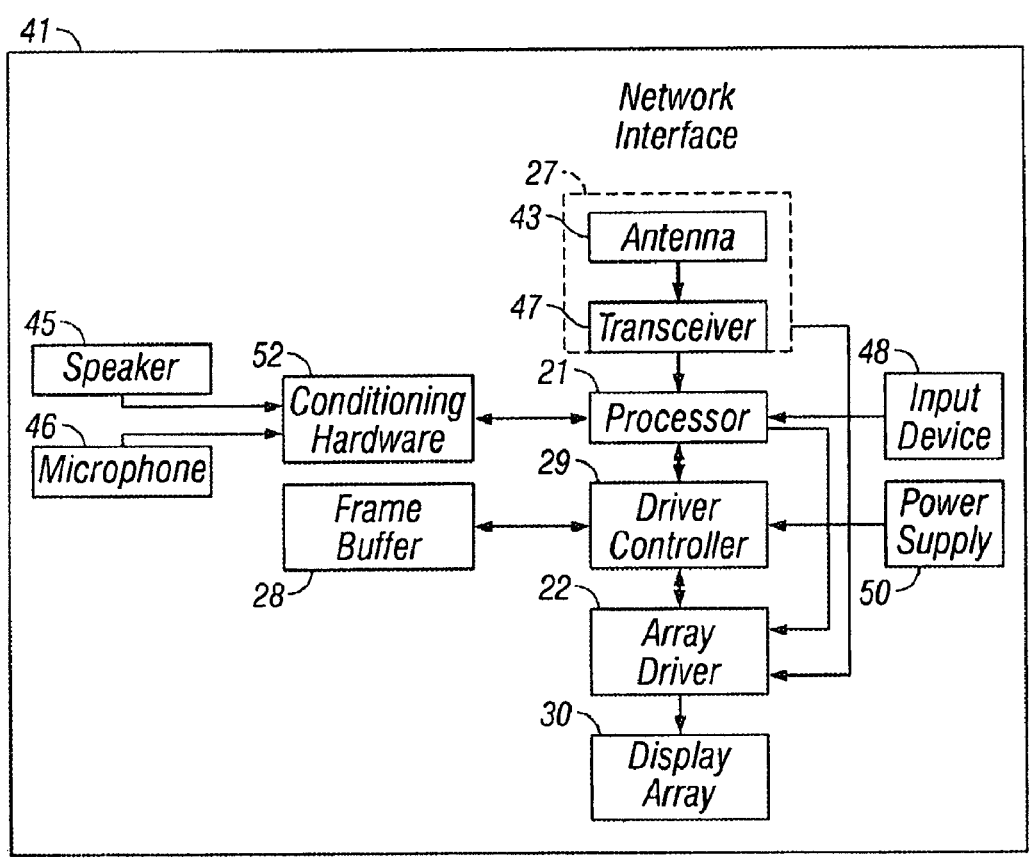

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.12 standard, including IEEE 802.12(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
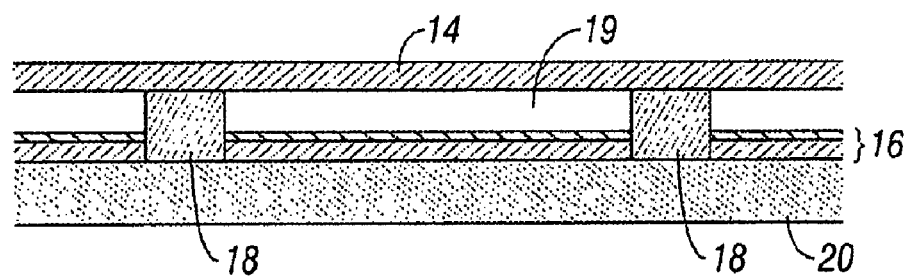
FIG. 7A is a cross section of the device of FIG. 1.
Figure 7B:
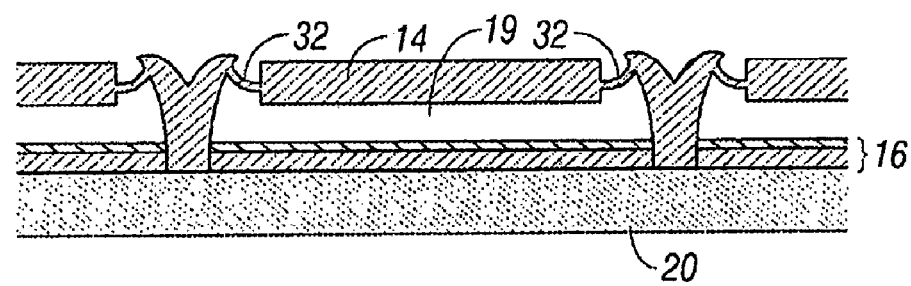
FIG. 7B is a cross section of an alternative embodiment of an interferometric modulator.
Figure 7C:
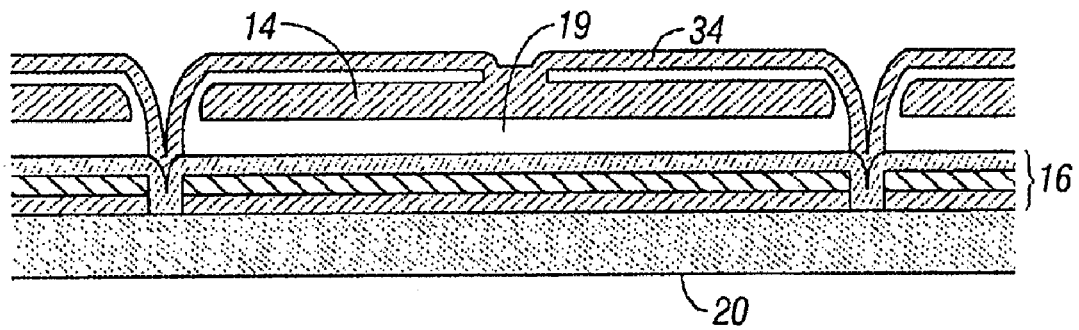
FIG. 7C is a cross section of another alternative embodiment of an interferometric modulator.
Figure 7D:
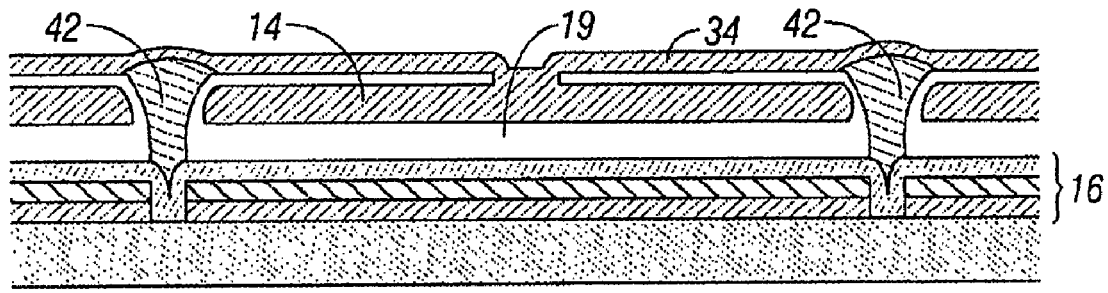
FIG. 7D is a cross section of yet another alternative embodiment of an interferometric modulator.
Figure 7E:
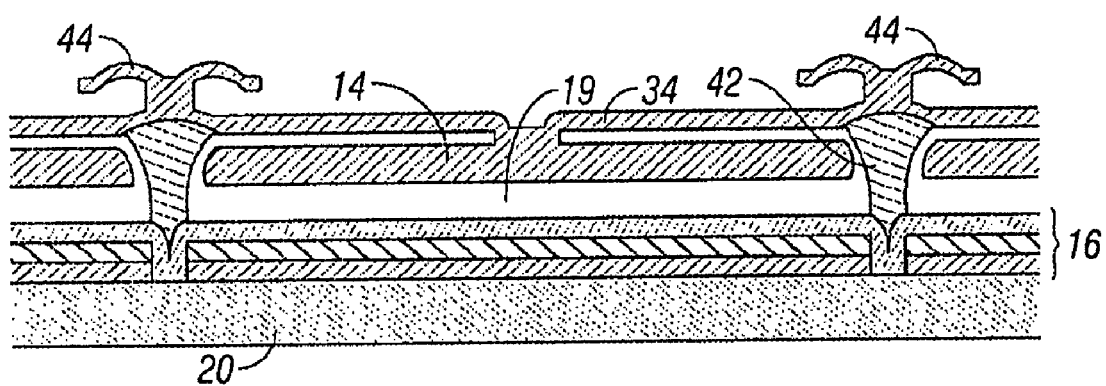
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8A:
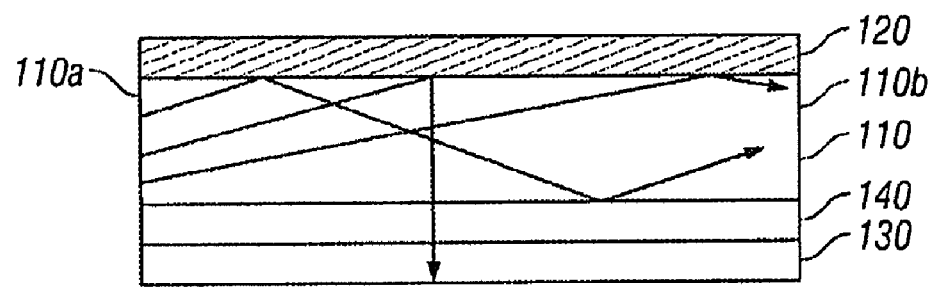
FIGS. 8A-8C are cross sectional views of embodiments of a display device comprising a light guide including a holographic light turning element configured to illuminate an array of light modulators.

Many types of reflective displays, including interferometric modulator displays, use ambient light for illumination. In conditions of low ambient light, an illumination apparatus can be used to provide illumination from an artificial light source. For example, FIG. 8A illustrates one embodiment of a front illumination apparatus 100 that can be used to illuminate an array of display elements or modulating elements 130 in a display device. The light modulating elements 130 may comprise, e.g., interferometric modulators, electrophoretic or reflective LCD elements, etc. and may be disposed on a substrate. This substrate may be used to support the modulating elements during fabrication. The substrate may comprise, for example, glass or plastic, although other materials may be used.

The illumination apparatus 100 can include a light guide 110 comprising, for example, one or more films, film stacks, layers, sheets, or slab-like components disposed in front of the array of modulating elements 130. In various preferred embodiments, the light guide 110 comprises glass or plastic. Additionally, in certain embodiments, the modulating elements 130 are formed on a substrate and the light guide 110 is disposed on the opposite side of the substrate. The light guide 110 may comprise one or more light guide layers formed on the side of the substrate opposite to the modulating elements. This light guide 110 has a first end 110a and a second end 110b. Light can be coupled into the light guide 110 at the first end 110a and can propagate from the first end 110a to the second end 110b guided therein, for example, by total internal reflection. The light guide 110 also has front and rear sides. The front side is farther from the modulating elements 130 while the rear side is closer to the light modulating elements.

This illumination apparatus 100 further comprises a multilayer stack with a holographic layer 120 configured to direct light propagating in the light guide 110 onto the modulating elements 130. This holographic layer 120 may comprise one or more volume or surface holograms.

More generally, the holographic layer may be referred to as diffractive optics, comprising for example diffractive features such as volume or surface features. In certain embodiments, the diffractive optics comprises one or more holograms. The diffractive features in such embodiments comprise holographic features.

Holography advantageously enables light to be manipulated so as to achieve a desired output for a given input. Moreover, multiple functions may be included in a single holographic layer. In certain embodiments, for instance, a first hologram comprising a first plurality of holographic features that provide for one function (e.g., turning light) and a second hologram comprising a second plurality of holographic features provide for another function (e.g. collimating light). Accordingly, the holographic layer 120 may comprise a first set of volume index of refraction variations or topographical features arranged to diffract light in a specific manner, for example, to turn light propagating across the light guide 110 into the array of light modulating elements 130 as well as a second set of volume index of refraction or topographical variations arranged to diffract light, for example, to collimate light. (Such a holographic layer may be equivalently considered by one skilled in the art as comprising multiple holograms or as comprising a single hologram having for example multiple optical functions recorded therein. Accordingly, the term hologram may be used herein to describe diffractive optics in which one or more optical functions have been holographically recorded. Alternately, a single holographic layer may be described herein as having multiple holograms recorded therein each providing a single optical function such as, e.g., collimating light, etc.) Additionally, although not shown, in some embodiments, the holographic layer may be attached to the illumination apparatus 100 with an adhesive such as a pressure sensitive adhesive (PSA), or other adhesive. In various embodiments, the adhesive is index matched or has an index similar to the holographic layer. Other methods may be used to attach the holographic layer to the illumination apparatus.

The holographic layer 120 shown in FIG. 8A is disposed on the front side of the light guide 130 and comprises a reflective hologram. The reflective holographic layer 120 of FIG. 8A reflects light within an angular range of acceptance toward the light modulating elements 130. This light may be directed substantially normal to the holographic layer 120 and the light modulating elements 130. For example, light diffracted by the hologram may be directed into a range of angles having an angular width of full width at half maximum (FWHM) between about 2° to 10°, 10° to 20°, 20° to 30°, 30° to 40°, 40° to 50° and may be centered at an angle of about 0 to 5°, 5°-10°, 10° to 15°, 15° to 20°, 20° to 25° with respect to the normal to the holographic layer. Accordingly, although FIG. 8A shows light incident on the modulator as being normal thereto, the turned light, if incident on the reflective light modulator at exactly 90°, would also be reflected back at 90°, would (pursuant to the principle of reciprocity) follow the same path in reverse and would not achieve the desired effect, for example, would not be directed to the viewer. Likewise, light described as being normal or appearing normal in the figures should be understood to deviate from normal at least enough to avoid retracing its incident path.

Light directed at other angles outside the range of acceptance angles of the holographic layer is reflected at an angle generally equal to the angle of incidence in some embodiments. This light may, for example, be reflected by total internal reflection from an interface between the holographic layer 120 and the light guide layer 110, for example, where the light guide layer has a higher index of refraction than the holographic layer, and the holographic layer is an optical isolation layer for the light guide. In other embodiments, light incident at angles outside the acceptance range is transmitted through the holographic layer 120, and reflected from a surface on the reverse side of the hologram 120. The light may be totally internally reflected at the interface between the holographic layer 120 and surrounding medium (e.g., air), for example, in the case where the holographic layer has a high index of refraction relative to the light guide. In alternative embodiments, the surface of the holographic layer 120 away from the light guide may be coated with a reflective layer comprising, for example, a metal, such as aluminum, or a dielectric material to provide reflection. Other approaches to introducing reflection are additionally or alternatively possible.

In some embodiments, the acceptance range may be centered at angles of about 5, about 10, about 15, about 20, about 25, about 30, about 35, about 40, about 45, about 50, about 55, about 60, about 65, about 70, about 75, about 80, or about 85 degrees, and may have a width (FWHM, for example) of about 1, about 2, about 4, about 5, about 7, about 10, about 15, about 20, about 25, about 30, about 35, about 40, or about 45 degrees. The efficiency of the hologram 120 may vary for different embodiments. The efficiency of a hologram is the ratio of (a) light incident within the acceptance range which is redirected (e.g., turned) by the hologram as a result of optical interference caused by the holographic features to (b) the total light incident within the range of acceptance, and is determined by the design and fabrication parameters of the hologram 120. In some embodiments, the efficiency is greater than about 1%, about 5%, about 10%, about 15%, about 20%, about 25%, about 30%, about 35%, about 40%, about 45%, about 50%, about 55%, 60%, about 65%, about 70%, about 75%, about 80%, about 85%, about 90%, or about 95%.

Another aspect is an optical isolation region 140 having a lower refractive index than the light guide 110 is also shown. This low refractive index region 140 may act as an optical isolation layer for the light guide 110. In such embodiments, the interface of light guide 110 and low n layer 140 forms a TIR (total internal reflection) interface. Light rays within the light guide 110 which are incident on the interface at greater than the critical angle (e.g., 40°), as measured with respect to the normal to the surface, will be specularly reflected back into the light guide 110. The low n region 140 has an index of refraction, n, less than the index of refraction of the light guide 110, and may, for example be a layer of material such as a layer of glass or plastic. Other materials may also be used. In various preferred embodiments, the material is substantially optically transparent such that the display elements 130 may be viewed through the material.

The low n region 140 advantageously isolates the light propagating across the light guide 110 from the modulating elements 130 unless the light is turned by the holographic layer 120 through the low n region 140 into the modulating elements. In some embodiments, the light modulating elements 130 are absorbing of at least some wavelengths or wavelength bands. Without the low n region 140, also referred to as an optical isolation region, light propagating across the light guide 110 might be lost to absorbing light modulating elements 130 located adjacent to the light guide.

In certain embodiments, the low index region 140 comprises an air gap or a gap filled with another gas or liquid. The light guide 110 and hologram 120 may be separated from the display elements 130 by the gap filled with air, gas, or other low index medium.

In some embodiments, the low index region comprises the substrate for the modulating elements 130. In such case, the light guide 110 may have an index of refraction higher than the substrate.

Accordingly, light propagating through the light guide 110, which is incident on the hologram 120 outside of the acceptance range, will continue to propagate across the surface of the display 100. However, light propagating through the light guide 110, which is incident on the hologram 120 within the acceptance range, will be turned so as to leave the holographic layer 120 and be incident on the low n layer 140 at about 90 degrees with respect to the holographic layer. The turned light will be transmitted through the low n layer 140 to illuminate the light modulators 130.

Figure 8B:
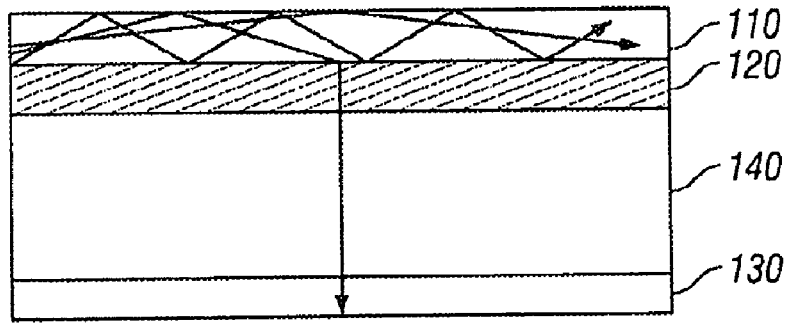

FIG. 8B is a cross section of another embodiment of an illumination apparatus 100 for a display device. The apparatus 100 comprises a light guide 110, holographic layer 120, and low n isolation layer 140, which are each disposed forward an array of light modulators 130.

In this embodiment, however, the holographic layer 120 comprises a transmissive hologram. The holographic layer 120 is configured to transmit light incident within the acceptance range and direct this transmitted light substantially perpendicular to holographic layer 120 and the light modulators 130. Accordingly, the light guide 110 is in front of the holographic layer 120 while the light modulators 130 are rearward of the holographic layer.

In certain embodiments, TIR interfaces are located at the interface between the light guide 110 and the front surface of the holographic layer 120 and at the interface between the light guide 110 and the medium (e.g., air) adjacent the illumination apparatus 100. Another low index layer (not shown) in front of the light guide 110 may also be used. In some embodiments, the interface between the holographic layer 120 and the optical isolation layer 140 form a TIR interface for guiding light within the light guide 110.

Accordingly, in certain embodiments, light propagates along the light guide from the first end to the second end via total internal reflection. Light incident on the holographic layer 120 at an angle within the range of acceptance is transmitted through the holographic layer 120 at normal incidence to the light modulating elements 130. This light passes through the low index isolation layer 140 to the light modulators 130.

Figure 8C:
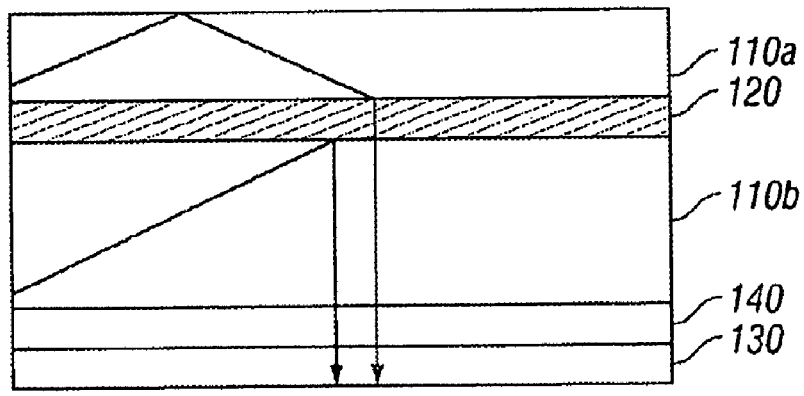

FIG. 8C is a cross section of another embodiment of an illumination apparatus 100 for a display device with a multi-layer stack comprising a light guide 110, holographic layer 120, and low index isolation layer 140 disposed forward of an array of display elements 130. In some embodiments, the display elements 130 are light modulators 130. In this embodiment, the light guide 110 has front and rear portions 110A and 110B, where the front light guide portion 110A is forward of the holographic layer 120 and the rear light guide portion 110B is rearward of the holographic layer 120. (These front and rear portions 110A and 110B may be referred to as light guides themselves.) As illustrated, the light modulators 130 are also rearward of the holographic layer 120. The front and rear portions 110A, 110B of the light guide 110 may comprise light guide films that sandwich the holographic layer 120 therebetween. The hologram(s) or holographic features may be recorded in the holographic layer 120 after the layer is sandwiched between the front and rear portions 110A, 110B.

As illustrated in FIG. 8C, each of the light guide portions 110A and 110B has a TIR surface. The light guide portion 110A has a TIR surface in the front of the front light guide portion 110A, and the light guide portion 110B has a TIR surface at the rear of the rear light guide portion 110B. The TIR surface in the front of the front light guide portion 110A is formed by the interface with the external medium (e.g., air) or with another low index layer in front of the front portion 110A. The TIR surface at the rear of the rear light guide portion 110B is formed by the interface of the low index isolation layer 140 with the light guide portion 110B.

The holographic layer 120, in this embodiment, comprises holographic features configured to turn and transmit light incident within a first acceptance range from light guide portion 110A, and to turn light incident within a second acceptance range from light guide portion 110B. The first angle is for light propagating within the front light guide portion 110A incident on the holographic layer 120 and the second angle is for the light propagating in the rear light guide portion 110B that is incident on the holographic layer. As shown in FIG. 8C, light from light guide portion 110A is turned and transmitted through the holographic layer 120, through light guide portion 110B and to the light modulators 130. Additionally, light from light guide portion 110B is turned and reflected from the holographic layer 120, through light guide portion 110B, and to the light modulators 130.

To provide for the different acceptance angles, multiple hologram o sets of holographic features may be recorded within the holographic layer 120. Such holograms or holographic features can be recorded by using beams directed at different angles.

For example, a holographic recording medium may be exposed to one set of beams to establish a reflection hologram. The holographic recording medium may additionally be exposed to a second set of beams to record a transmission hologram. The holographic recording medium may be developed such that the two holograms are formed, for example, in a single layer. In such an arrangement, two sets of holographic features, one corresponding to the reflection hologram and one corresponding to the transmission hologram are formed. (One skilled in the art may refer to the aggregate structure as a single hologram or alternately as multiple holograms.)

Optical or non-optical replication processes may be employed to generate additional holograms. For example, a master can be generated from the developed layer and the master can be used to produce similar holograms having the two sets of holographic features therein to provide the reflective and transmissive functionality such as shown in FIG. 8. Intermediate structures may also be formed. For example, the original can be replicated one or more times before forming the master or product.

(As described above, the replicated holographic structure may be referred to as a single hologram comprising multiple sets of holographic features that provide different functions. Alternatively, the sets of holographic features providing different functions can be referred to as different holograms.)

The holographic features may comprise, for example, surface features or volume features of the holographic layer 120. Other methods can also be used. The holograms may for example be computer generated or formed from a master. The master may or may not be computer generated. In some embodiments, different methods or a combination of methods are used.

In some embodiments, the first and second acceptance ranges have substantially the same magnitude but different signs. For example, in one embodiment, the first acceptance range is centered at about 20 degrees and is about 4 degrees wide and the second acceptance range is centered at about −20 degrees and is about 4 degrees wide. Other angles are possible. In some embodiments, however only one hologram configured to turn the light to the modulators is recorded (reflective or transmissive). In other embodiments, only reflection holograms configured to turn the light to the modulators are recorded in the holographic layer 120. In other embodiments, only transmissive holograms configured to turn the light to the modulators are recorded.

In some embodiments, other holograms or sets of holographic features may also be included. For example, the holographic layer 120 may also be configured to collimate and/or diffuse ambient light incident thereon. Other features may additionally be included.

As mentioned above, a hologram, or its holographic features, has a limited efficiency. Accordingly, only a portion of the light within the acceptance range is turned toward the light modulators 130. The un-turned portion reflects from or is transmitted through the holographic layer 120 at an angle of reflection or angle of transmission having substantially the same magnitude as the angle of incidence on the holographic layer. The holographic layer, for example, may act as an optical isolation layer for the light guides in some embodiments, although in others the light may pass through to the holographic layer if not within the range of acceptance angles. Accordingly, the transmitted or reflected light will continue to propagate within the light guide 110 totally internally reflecting from an interface of the light guide 110. Accordingly, this light will again be directed back towards the holographic layer 120. Because this light is within the acceptance range, a portion is again turned by the holographic layer 120 toward the light modulators 130. However, unless adjusted for, the power of the light turned at the second turning is less than that of the first turning. For example, if the efficiency of the hologram 120 is 50%, 50% of the incident light within the acceptance range is turned toward the light modulators 130 on the first pass, and 50% of the incident light within the acceptance range continues to propagate across the display 100. After reflecting from the TIR interface, the propagated 50% interacts with the holographic layer 120 on the second pass. As a result of the 50% efficiency of the hologram, 50% of the propagated 50% is turned, and 50% of the propagated 50% continues to propagate along the light guide. Accordingly, light directed to the modulating elements on the second pass has 25% of the optical power of the original light incident on the holographic layer on the first pass. Similarly, the propagated light after the second pass has 25% of the optical power of the original light incident on the holographic layer on the first pass. In this example, of the original light incident on the holographic layer 120, 50% is turned at the first pass, 25% is turned upon the second pass, 12.5% is turned upon the third pass, and so forth. This effect is problematic as the result is that one side of the screen is brighter than the other. Embodiments discussed below, however, offer solutions to this problem.

Additional holograms may be recorded in the holographic layer 120 for the different embodiments described herein. These holograms may correspond to different angles of incidence, transmission, and/or reflection. Accordingly, a variety of acceptance angles may be provided. Similarly, the additional holograms provide different angles at which light is directed to the light modulating elements 130.

Moreover, additional holograms may introduce diffusion. One or more holographic diffusers may be recorded in the holographic layer 120. The holographic layer 120 may thus operate as a diffuser in front of the light modulating elements 130. The diffuser may reduce the specular or mirror-like appearance of certain modulating devices such as interferometric modulators. The diffuser may also reduce the pixilation of some light modulator arrays. The diffuser may also alter the angle of propagation of light within the light guide, such that after interacting with the diffuser, the light is within the angle of acceptance of the holographic layer. Such holographic diffusers may be formed optically, may be computer-generated, or may be formed by using other approaches. Other functionalities can be added by recording additional holograms in the layer.

Other variations are also possible. For example, although a low index optical isolation layer 140 is shown in FIGS. 8A-8C, this isolation layer may be excluded in certain embodiments. For example, the holographic layer 120 may be disposed directly on the substrate on which the light modulating elements 130 are formed. The holographic layer 120 may be formed on a front side of the substrate and the light modulating elements 130 may be formed on a rear side of the substrate. In some embodiments, the substrate may form all or part of the light guide.

Figure 9A:
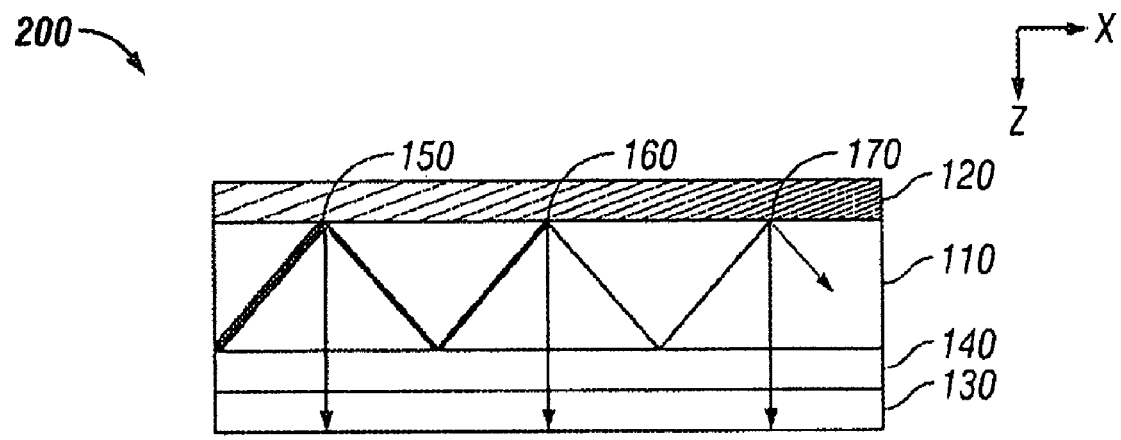
FIGS. 9A-9B are cross sectional views of embodiments of a display device comprising a light guide with a holographic light turning element configured to illuminate an array of light modulators with substantially equal brightness across the array.

FIG. 9A is a cross section of one embodiment of an illumination apparatus 200 comprising a light guide 110, holographic layer 120, and low n layer 140 disposed in front of light modulators 130. The embodiment of FIG. 9A is similar to that shown in FIG. 8A. FIG. 9A illustrates the operation of the light guide 110, low index layer 140, and holographic layer 120, which propagate light across the array of light modulators 130. In this embodiment, however, the holographic layer 120 distributes light propagated along the light guide 110 so as to provide substantially uniform brightness to the array of light modulating elements 130.

In another embodiment, rather than a varying optical density affecting the efficiency of the hologram at different positions, the hologram may have a uniform efficiency and a varying range of acceptance angles. For example, near the incident light source the range of acceptance angles may be narrow. Further away from the light source, the range of acceptance angles turned by the hologram may broaden and hence increase the amount of light turned by the hologram. In another embodiment some combination of efficiency and acceptance angle may be arranged in order to uniformly direct light to the array of light modulating elements 130.

In this embodiment, the holographic layer 120 is configured to have increasing efficiency across the length (x direction) of the light guide 100. The increased efficiency may be introduced by increasing the diffraction efficiency of the holographic layer 120, which is schematically indicated in FIG. 9A by increasingly dense hatching in the holographic layer 120. For example, the holographic layer 120 can be formed such that the efficiency at the first pass 150 is 20%, the efficiency at the second pass 160 is 25%, and the efficiency at the third pass is 33%. Accordingly of the power of the light incident on the holographic layer 120 at the first location 150, 20% is turned and 80% is propagated. At the second location 160, 80% of the original light in the range of acceptance angles is incident. Because the efficiency of the holographic layer 120 at the second location 160 is 25%, 20% of the original light is turned, and 60% is propagated. At the third location 170, 60% of the original light in the range of acceptance is incident. Because the efficiency at the third location 170 is 33%, 20% of the original light is turned, and 40% is propagated. Because the hologram 120 is formed with varying efficiency across the length of the light guide 110, the amount of light turned at each location 150, 160, 170 is 20% of the original light incident on the holographic layer 120 within the range of acceptance angles. Accordingly, the brightness does not vary across the array of modulating elements 130.

A hologram having progressively increasingly efficiency across its spatial extent may be formed, for example, by using a beam having a gradient in intensity across its width in the recording process. Such a gradient intensity can be obtained by using a neutral density filter having a gradient in optical density. Other methods may be used to produce the hologram. The holograms may be computer generated. The holograms may also be produced using a master.

Figure 9B:
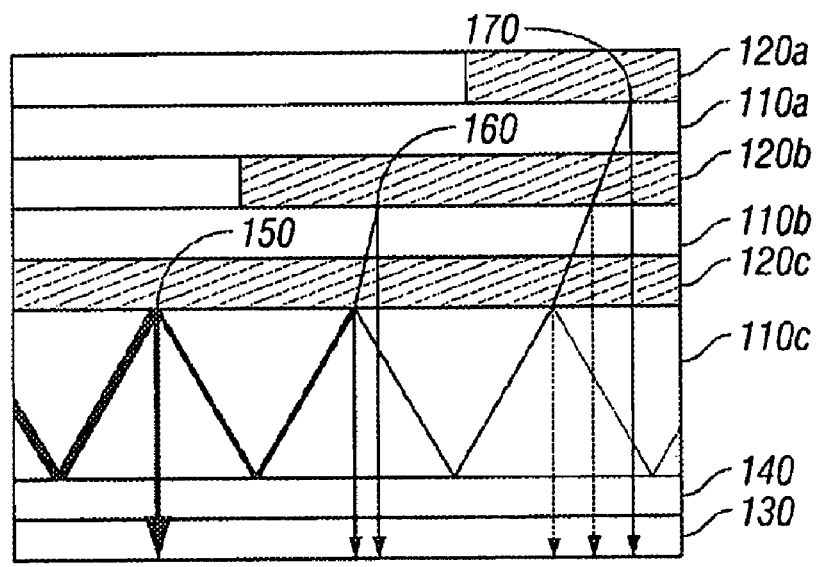

FIG. 9B shows another structure which can be used additionally or alternatively to vary the efficiency of the holographic layer 120. According to this embodiment, the light guide 110 has layers 110A, 110B, and 110C, and the holographic layer 120 has stacked layered portions 120A, 120B, and 120C. Increased hologram efficiency is achieved, at least in part, by adding additional layered portions and arranging the stacked portions such that the number of stacked holographic portions or the total thickness of the layered holographic portions is smaller at the first end of the light guide and increases along the length of the holographic layer to the second end of the light guide. Accordingly, light injected into the light guide 110 has increased opportunity to be diffracted at locations closer to the second end where the optical power within the light guide will be less.

As shown in FIG. 9B, for example, according to the efficiency of the holographic layer 120 at the first location 150, a portion of the incident light is turned and a portion continues to propagate along the light guide 110 (e.g. light guide portion 110c). At the second location 160, although only a portion of the original incident light is available, the light is incident on a holographic multilayer comprising two sublayers, and a higher effective efficiency is thereby achieved. Similarly, at the third location, the light is incident a holographic multilayer comprising in addition to the two sublayers, a third sublayer to effectively further increase the turning efficiency. As the hologram layers 120A, 120B, and 120C are each formed, their respective individual efficiencies can be tailored such that the effective combined efficiencies at each turning may produce substantially identical portions of turned light.

FIG. 9B only shows a few rays traced for illustrative purposes and does not represent a complete picture of the effect on the light of each reflection at each layered holographic portion. Nevertheless, rays not shown are also affected by the progression in optical efficiency and thus may further contribute to the uniformity of light across the array of modulating elements. Additionally, in other embodiments, more (or fewer) sublayers may be used.

Accordingly, by progressively increasing the efficiency of the holographic layer 120 from the first end to the second end, the array of light modulating elements can be substantially uniformly illuminated. The efficiency may increase from 0-5 to 10-50% across a distance of 0-10 to 25-50 mm. Accordingly, the efficiency may increase at a rate of 0.1 to 2%/mm. This gradation can be smooth or a step-like progression. The steps may be about 5 mm wide. The resultant uniformity of light turned out of the light guide may be 20 to 80% across a length of 0 to 50 mm.

Figure 10A:
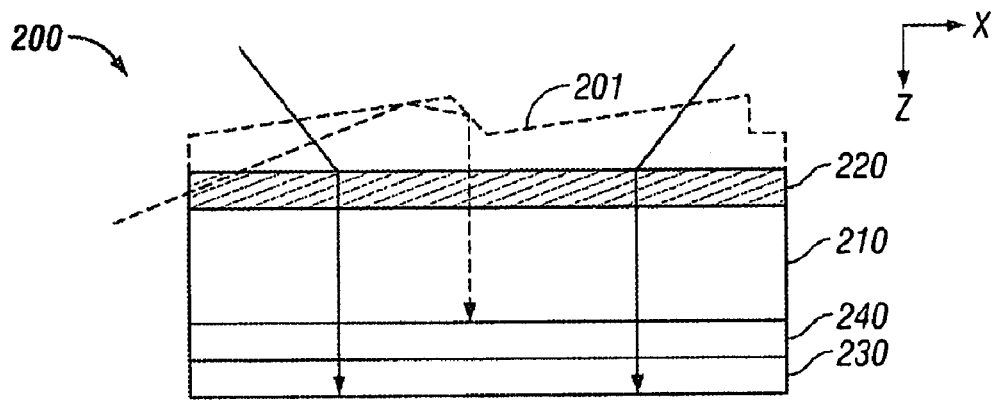
FIGS. 10A-10D are cross sectional views of embodiments of a display device comprising a holographic element configured to achieve enhanced lighting when an array of light modulators is illuminated with ambient light by collimating the incident ambient light.

FIG. 10A shows an embodiment of an illumination apparatus 200 comprising a holographic layer 220, a light guide 210, and low n layer 240, in front of a plurality of light modulators 230. In some embodiments, the light modulators 230 may comprise interferometric modulators having reflective surfaces such as are described above.

The holographic layer 220 is configured to substantially collimate ambient light incident on the holographic layer from a range of angles. Certain modulating elements 230 such as interferometric modulators modulated light rays normal to the modulators. Other rays may be absorbed and not contribute to the image formation. By substantially collimating the light and directing the light substantially normal to the array of modulators 230, the incident light that is used for near normal viewing of the image display is increased. Accordingly, the brightness of the displayed image when viewed at near normal is increased using ambient light. The collimated light rays described herein, however, need not be perfectly parallel but may vary within about ±10 degrees of each other. Accordingly, collimated rays directed at generally normal incidence onto the modulators may be oriented within about ±10 degrees of the normal to said modulators. Additionally, in some embodiments only a portion of the ambient light, for example, 70% to 50%, 60% to 40%, 50% to 30%, 40% to 20%, or 30% to 10% or less may be collected and collimated by the hologram. For example, in many display applications, ambient light overhead can be collected and used whereas ambient light from below is blocked by the user.

The holographic layer may be configured, for example, to collect light from an angular range of between about 45° to 90° with respect to the normal to the holographic layer 220 and redirect the rays into a range of between about 0° to about 40° with respect to the normal, or in other embodiments between about 0° to about 20°. Other ranges are also possible.

FIG. 10A additionally shows an optional prismatic turning film 201 that can be disposed on the holographic layer 220. The prismatic turning film 201 can be used to turn light propagating along the length (x direction) of light guide 210 toward the display elements (in the z direction) such that the light is substantially normal to the array of display elements.

Figure 10B:
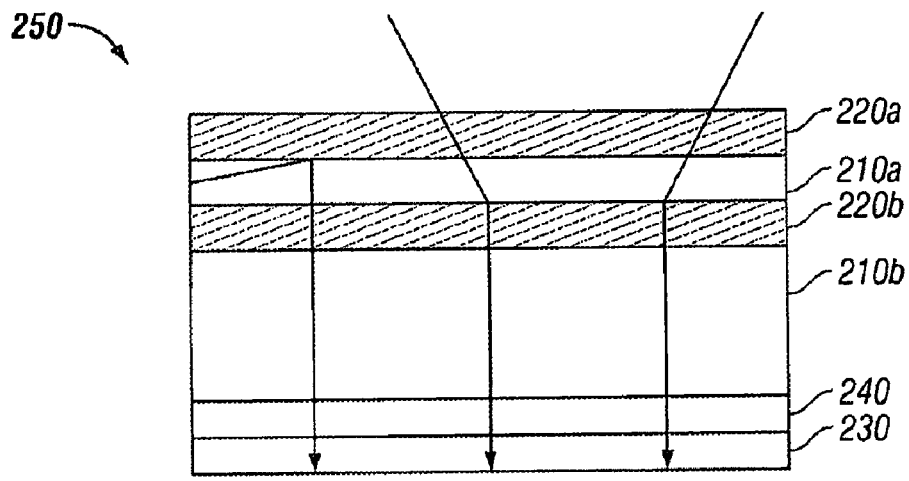

FIG. 10B shows an embodiment of an illumination apparatus 250 which includes first and second holograms 220A and 220B and first and second light guide portions 210A, 210B, on which said first and second holograms are disposed, and a low index isolation layer 240 in front of a plurality of light modulators 230. As shown, the first hologram 220A is disposed in front of the first light guide portion 210A. The first light guide portion 210A is disposed in front of the second hologram 220B, and the second hologram 220B is disposed in front of the second light guide portion 210B, which is disposed in front of the optical isolation layer 240 and the light modulating elements 230.

The second hologram 220B of display 250 is configured to collect ambient light incident thereon over a range of non-normal angles and to collimate and direct the collected light substantially normal to the light modulating elements 230, as described above with respect to hologram 220 of apparatus 200 shown in FIG. 10A. The ambient light brightness is increased by the second hologram 220B. Additionally, first hologram 220A is configured to turn light of a certain acceptance angle range such that it is substantially perpendicular to the light modulator layer 230. The second hologram 220A may have similar configuration and function as hologram 120 according to various embodiments described above.

Figure 10C:
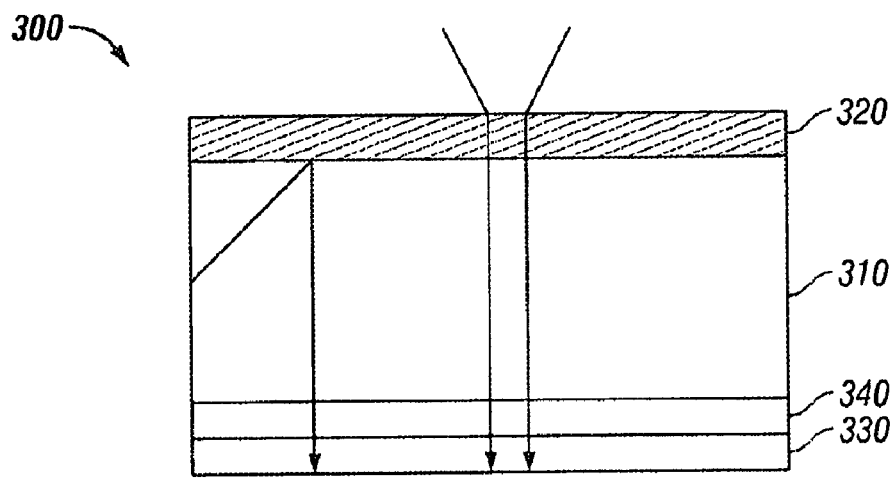

FIG. 10C shows an embodiment of a display 300 which has a single holographic layer 320, a light guide 310, and a low index isolation layer 340 disposed in front of the light modulators 330. The light guide 310, low n layer 340, and light modulators 330 have functionality and structure which may be similar to that of similar structures described above.

The holographic layer 320 comprises first and second holograms or sets of holographic features having the functions described above with reference to holograms 220A and 220B, respectively shown in FIG. 10B. These first and second holograms or sets of holographic features can be recorded in the same holographic medium. Optical recording by using two different optical set-ups: one wherein wide angle illumination representing ambient lighting is used and one where light is propagated along the light guide. Other methods may also be used to record the multiple holographic features in the holographic layer 320. The holographic features may, for example, be computer generated. Additionally, one or more holographic masters may be used.

The first hologram or set of holographic features is configured to turn light propagating within the light guide 310 normal to the light modulating elements 330. The second holographic feature is configured to collect a wide range of angles of ambient light and direct the light onto the modulating elements 330 at substantially normal incidence thereto. The first hologram or set of holographic features may also collimate the light. Accordingly, the display device has holographically enhanced display brightness characteristics similar to that described above with reference to FIG. 10B. Advantageously, however, the first and second holographic features may be integrated in a single holographic layer 320. In some embodiments, an additional holographic feature may be included. For example, a third hologram or set of holographic features which diffuses light reflected from the modulators may be included. The third set of holographic features may be integrated with any of the other sets of holographic features. In some embodiments, the third set of holographic feature is disposed in a separate holographic layer.

Figure 10D:
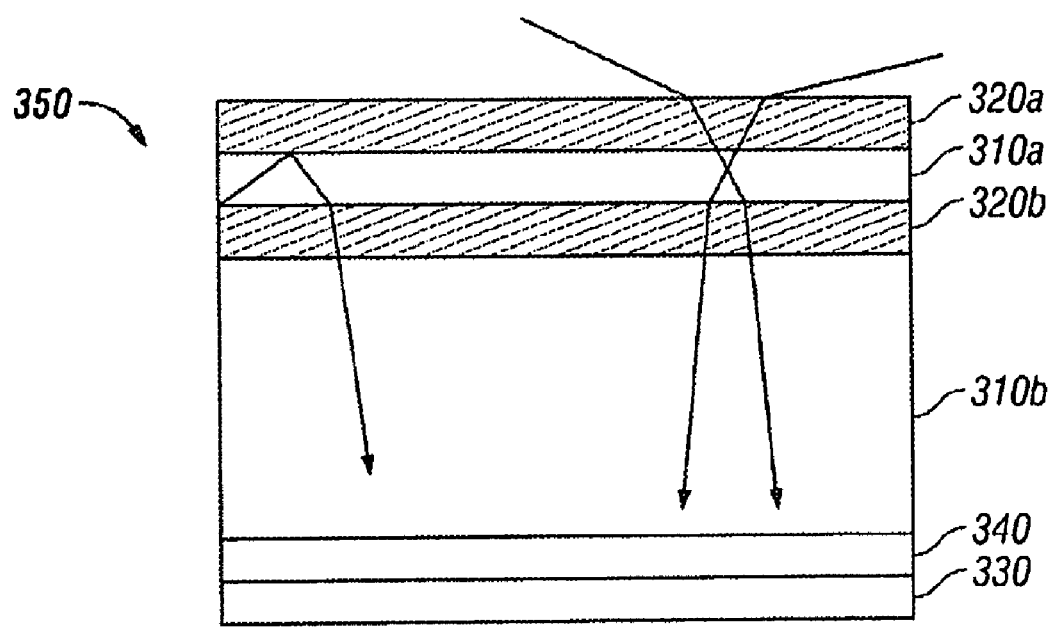

FIG. 10D shows an embodiment of a display 350 which has first and second holograms 320A and 320B, disposed on first and second light guides portions 310A and 310B, respectively, and low index isolation layer 340, disposed in front of light modulators 330. The light guides portions 310A and 310B, low index layer 340, and light modulators 330 have functionality and structure which may be similar to that of similar elements described above.

In this embodiment, the first and second holograms 320A and 320B cooperatively increase the brightness of the display 350. The first hologram 320A has functionality similar to the holographic layer 320 described above in reference to FIG. 10C. The first hologram 320A is configured to collimate ambient light and direct the light into a narrower range of angles that are directed more normal to the plurality of modulating elements. The second hologram 320B is configured to further collimate light incident to it. The second hologram 320B is configured to receive a range of angles and to transmit that light into a smaller range of angles directed to the light modulators 330. This transmitted range of angles is also substantially centered substantially normal to the light modulating elements. Accordingly, holograms 320A and 320B cooperatively increase the brightness of the display 350 by increasing the collimation of ambient light and increasing steepness of the angle at which ambient light incident on the hologram 320A is directed into light modulators 330. For ambient light, hologram 320A partially collimates light from wide angles and transmits the light to hologram 320B, which is configured to further collimate the light and transmit it to the light modulators 330 at substantially normal angles.

Similarly, for light propagating along the light guide 310A, the first hologram 320A turns the light into a range of angles substantially normal to the light modulating elements. The second hologram 320B received this light and transmits the light into a narrower range of angles. The hologram 320B further collimates the turned light so that it is incident on the light modulators 330, has a greater intensity, and is substantially normal to the light modulating elements. Brightness is thereby increased.

As described above, a holographic diffuser can also be incorporated into the light apparatus of any of the embodiments in FIGS. 1A-10D. This holographic diffuser may be included on a separate layer or may be recorded on one of the holographic layers already present. The holographic diffuser may have a limited field of view into which light from the light modulating elements is scattered so as to increase brightness. A viewer will typically view the display device and the light modulating elements from a limited number of viewing positions and angles. Accordingly, in some embodiments, the diffuser need not scatter light into a large range of angles.

Figure 10E:
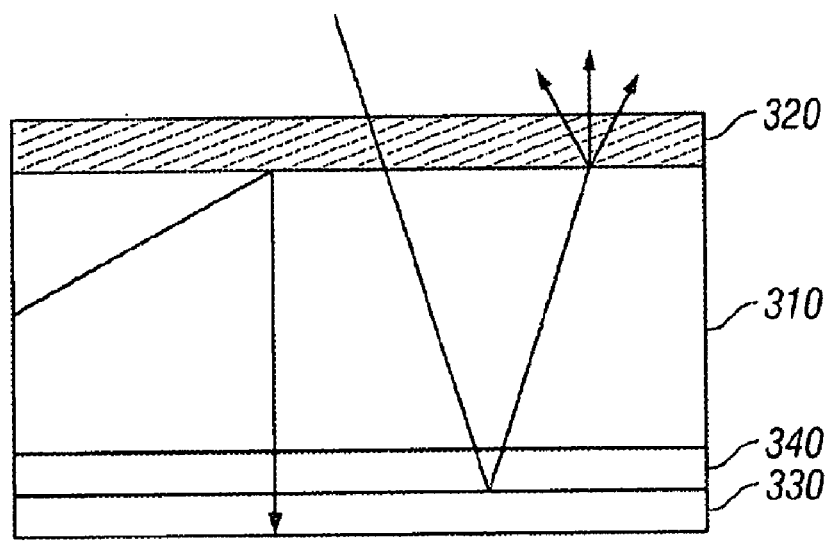
FIG. 10E is a cross sectional view of an embodiment of a display device comprising a holographic element configured to diffuse light reflected from the array of light modulators.

FIG. 10E shows an embodiment of a display 400 which has a single holographic layer 320, a light guide 310, and a low index isolation layer 340 disposed in front of the light modulators 330. The light guide 310, low n layer 340, and light modulators 330 have functionality and structure which may be similar to that of similar structures described above.

The holographic layer 320 comprises first and second holograms or sets of holographic features configured to turn light from the light guide 310 toward the light modulators 330 and configured to diffuse light incident thereon. These first and second holograms or sets of holographic features can be recorded in the same holographic layer. Optical recording by using two different optical set-ups: one representing light directed to a viewer is used and one where light is propagated along the light guide. Other methods may also be used to record the multiple holograms or sets of holographic features in the holographic layer 320. The holograms or holographic features may, for example, be computer generated. Additionally, one or more holographic masters may be used. The master may or may not be computer generated. In some embodiments, the first and second holograms or sets of holographic features are disposed in first and second layers, respectively.

The first holographic feature is configured to turn light propagating within the light guide 310 normal to the light modulating elements 330. The second holographic feature is configured to diffuse light reflected from the modulating elements 330. In some embodiments, a third hologram or set of holographic features may additionally collimate the light. Accordingly, the display device has holographically enhanced display lighting characteristics. Advantageously, the first and second holograms or sets of holographic features may be integrated in a single holographic layer 320.

Figure 11A:
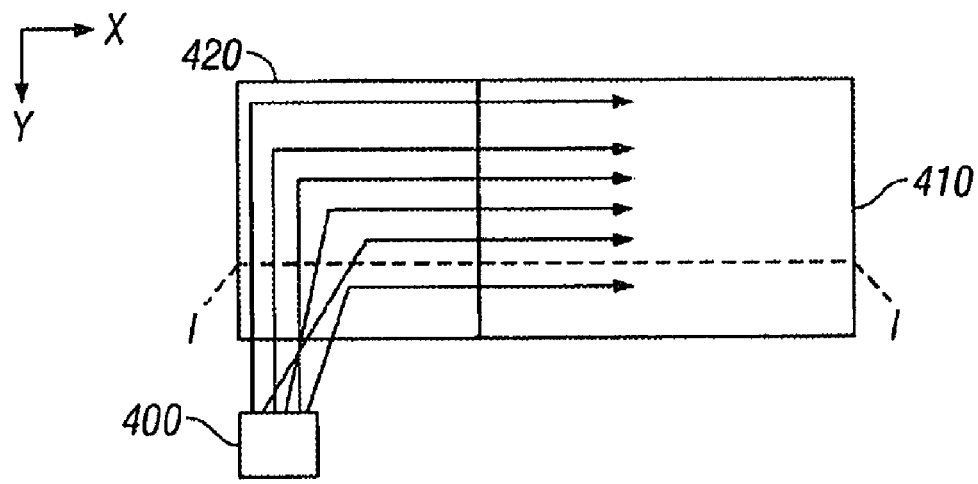
FIG. 11A is a cross sectional view of a hologram which incorporates the function a light bar.
Figure 11B:
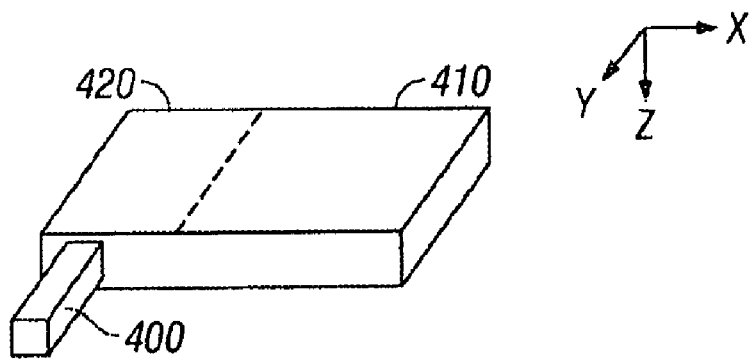
FIG. 11B is a perspective view of a hologram which incorporates the function a light bar.

Diffractive optics comprising holograms can be used in other ways. FIG. 11A is a top view of a light source 400 disposed with respect to a light guide 410 to inject light along the width of the light guide. FIG. 11B is a perspective view showing the light source 400 disposed at an edge of the light guide 410 to edge couple light therein. The light guide 410 comprises a hologram portion 420 that includes a hologram configured to receive light injected by the edge coupled light source 400 and to turn the light such that the light propagates along the length (x direction) of the light guide 410. The hologram is also configured to distribute the light along the width (y direction) of the light guide 410. The hologram therefore substitutes for a light bar for the light guide 410. FIG. 11A also shows the line I-I, which defines a cross section across the light guide. In certain embodiments, the light guide 410 can have a cross-section I-I similar to the cross sections shown in any of FIGS. 8-10 depending on the configuration. The hologram in hologram portion 420 is configured to turn light of a range of angles into a narrower set of angles such that light propagating along the length of the light guide is substantially collimated. Additionally, the distribution of rays is substantially parallel to the length-wise direction (x) of the light guide 410.

Figure 11C:
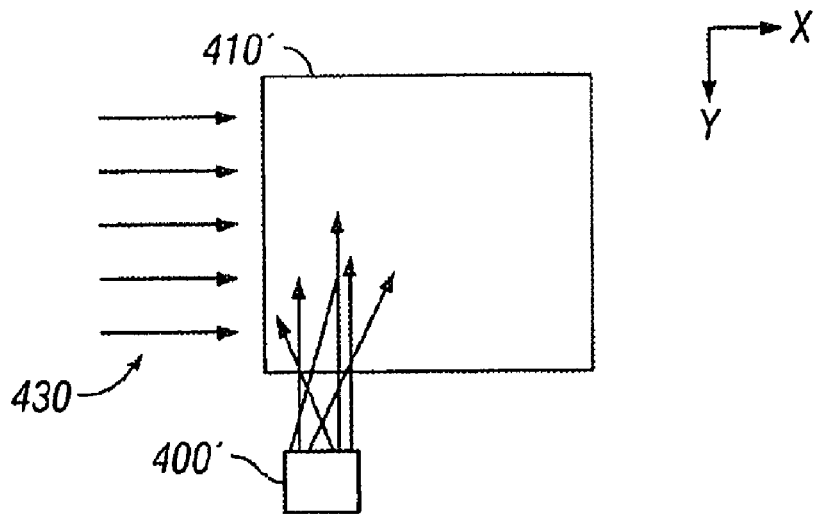
FIG. 11C is a cross sectional view of recording a hologram which incorporates the function a light bar.

FIG. 11C shows one method of optically recording a hologram for the hologram portion 420. A reference light source 400' injects a light beam into a light guide 410' along the width (y direction). This light beam may include a wide range of angles. Simultaneously, a more collimated light source is disposed with respect to the light guide 410' such that collimated rays 430 are injected into the light guide 410' along the length-wise direction (x) of a light guide. The light guide 410' includes a film in the portion of the light guide where the two beams intersect. This film is developed to produce a hologram or a master. As described above, additional functionality may be incorporated into the diffractive optics with additional holographic recordings. Other methods may be used to produce the hologram. In some embodiments, the hologram may be computer generated.

A wide variety of variation is possible. Films, layers, components, and/or elements may be added, removed, or rearranged. Additionally, processing steps may be added, removed, or reordered. Also, although the terms film and layer have been used herein, such terms as used herein include film stacks and multilayers. Such film stacks and multilayers may be adhered to other structures using adhesive or may be formed on other structures using deposition or in other manners. Similarly, as described above, sets of holographic features providing multiple functionality may integrated together in a single layer or in multiple layers. Multiple sets of holographic features included in a single layer to provide multiple functionality may be referred to as a plurality of holograms or a single hologram.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above.

What is claimed is:

1. An illumination apparatus having front and rear surfaces, the illumination apparatus comprising:
    a plurality of holographic features between the front and rear surfaces, the front surface being forward the holographic features and the rear surface being rearward the holographic features;
    a first light guide forward the holographic features, wherein a largest surface of the first light guide faces the front surface; and
    a second light guide rearward the holographic features, the first and second light guides each configured to guide light therein,
    wherein the holographic features are disposed between the first light guide and the second light guide, and
    wherein the holographic features are configured to turn at least a portion of the light from each of the first and second light guides, such that the turned portions of light exit the apparatus through the rear surface.

2. The illumination apparatus of claim 1, wherein said holographic features are disposed in a holographic layer.

3. The illumination apparatus of claim 2, wherein said holographic layer forms an optical isolation layer for the first and second light guides.

4. The illumination apparatus of claim 1, wherein said holographic features comprise volume or surface features.

5. The illumination apparatus of claim 1, further comprising a plurality of display elements disposed rearward of said rear surface.

6. The illumination apparatus of claim 5, wherein the plurality of display elements comprises a plurality of interferometric modulators.

7. The illumination apparatus of claim 1, wherein the holographic features are further configured to collect ambient light incident thereon, and to collimate said collected light.

8. The illumination apparatus of claim 1, wherein the holographic features are further configured to diffuse light propagating from the rear surface.

9. The illumination apparatus of claim 8, wherein the holographic features are further configured to collect ambient light incident thereon, and to collimate said collected light.

10. The illumination apparatus of claim 1, further comprising:
- a display;
- a processor that is configured to communicate with said display, said processor being configured to process image data; and
- a memory device that is configured to communicate with said processor.

11. The illumination apparatus of claim 10, further comprising a driver circuit configured to send at least one signal to the display.

12. The illumination apparatus of claim 11, further comprising a controller configured to send at least a portion of the image data to the driver circuit.

13. The illumination apparatus of claim 10, further comprising an image source module configured to send said image data to said processor.

14. The illumination apparatus of claim 13, wherein the image source module comprises at least one of a receiver, transceiver, and transmitter.

15. The illumination apparatus of claim 10, further comprising an input device configured to receive input data and to communicate said input data to said processor.

16. The illumination apparatus of claim 1, wherein the holographic features are configured such that the turned portion of light from the first light guide propagates through the holographic features into the second light guide, and further configured such that the turned portion of light from the second light guide is redirected towards the rear surface and prevented from propagating into the first light guide.

17. An illumination apparatus having front and rear surfaces, the illumination apparatus comprising:
- holographic means for diffracting light between the front and rear surfaces, the front surface being forward the diffracting means and the rear surface being rearward the diffracting means;
- first means for guiding light disposed forward the diffracting means, wherein a largest surface of the first light guiding means faces the front surface; and
- second means for guiding light disposed rearward the diffracting means, the first and second light guiding means each configured to guide light therein,
- wherein the holographic means are disposed between the first light guiding means and the second light guiding means, and
- wherein the diffracting means are configured to turn at least a portion of the light from each of the first and second light guiding means, such that the turned portions of light exit the apparatus through the rear surface.

18. A method of manufacturing an illumination apparatus having front and rear surfaces, the method comprising:
- disposing a plurality of holographic features between the front and rear surfaces, the front surface being forward the holographic features and the rear surface being rearward the holographic features;
- disposing a first light guide forward the holographic features, such that a largest surface of the first light guide faces the front surface; and
- disposing a second light guide rearward the holographic features, the first and second light guides each configured to guide light therein, such that the holographic features are disposed between the first light guide and the second light guide,
- wherein the holographic features are configured to turn at least a portion of the light from each of the first and second light guides, such that the turned portions of light exit the apparatus through the rear surface.

19. A method of using a multilayer stack having front and rear surfaces, the method comprising:
- guiding light in a first light guide forward a plurality of holographic features, the holographic features between the front and rear surfaces, the front surface being forward the holographic features and the rear surface being rearward the holographic features;
- guiding light in a second light guide rearward the holographic features, wherein a largest surface of the first light guide faces the front surface, and wherein the holographic features are disposed between the first light guide and the second light guide; and
- with the holographic features, turning at least a portion of the light from each of the first and second light guides, such that the turned portions of light exit the apparatus through the rear surface.

20. An apparatus having front and rear surfaces, the apparatus comprising:
- a light guide having first and second ends, such that light injected into said first end is guided toward said second end via total internal reflection, wherein a largest surface of the light guide faces the front surface; and
- diffractive optics disposed to receive light guided within the light guide and configured to turn a portion of said guided light out of said light guide, said diffractive optics further configured to collect ambient light incident thereon and collimate said ambient light,
- wherein said diffractive, optics comprises at least one holographic element.

21. An apparatus having front and rear surfaces, the apparatus comprising:
- means for guiding light having first and second ends, such that light injected into said first end is guided toward said second end via total internal reflection, wherein a largest surface of the light guiding means faces the front surface; and
- means for diffracting light disposed to receive light guided within the light guiding means and configured to turn a portion of said guided light out of said light guiding means, said light diffracting means further configured to collimate ambient light incident thereon,
- wherein said light diffracting means diffracts light holographically.

22. A method of manufacturing an illumination apparatus having front and rear surfaces, the method comprising:
- providing a light guide having first and second ends, such that light injected into said first end is guided toward said second end via total internal reflection, wherein a largest surface of the light guide faces the front surface; and
- disposing diffractive optics to receive light guided within the light guide and configured to turn a portion of said guided light out of said light guide, said diffractive optics further configured to collimate said ambient light,
- wherein said diffractive optics comprises at least one holographic element.

23. An illumination apparatus having front and rear surfaces, the apparatus comprising:
- a light guide having first and second ends and forward and rearward surfaces, the light guide adapted such that light injected into said first end is guided between said forward and rearward surfaces toward said second end via total internal reflection, wherein the forward surface of the light guide faces the front surface of the apparatus; and
- diffractive optics disposed to receive light guided within the light guide and configured to turn a portion of said guided light out of said light guide through said rearward surface, said diffractive optics further configured to diffuse light that enters said light guide through said rearward surface and exits said light guide through said forward surface, wherein said diffractive optics comprises at least one holographic element.

24. An illumination apparatus having front and rear surfaces, the apparatus comprising:
- means for guiding light having first and second ends and forward and rearward surfaces, the light guiding means adapted such that light injected into said first end is guided between said forward and rearward surfaces toward said second end via total internal reflection, wherein the forward surface of the light guide faces the front surface of the apparatus; and
- means for diffracting light, the diffracting means configured to receive light guided within the light guiding means and turn a portion of said guided light out of said light guiding means through said rearward surface, said light diffracting means further configured to diffuse light that enters said light guiding means through said rearward surface and exits said light guiding means through said forward surface, wherein said light diffracting means diffracts light holographically.

25. A method of manufacturing an illumination apparatus having front and rear surfaces, the method comprising:
- providing a light guide having first and second ends and forward and rearward surfaces, the light guide adapted such that light injected into said first end is guided between said forward and rearward surfaces toward said second end via total internal reflection, wherein the forward surface of the light guide faces the front surface of the apparatus; and
- disposing diffractive optics to receive light guided within the light guide and turn a portion of said guided light out of said light guide through said rearward surface, said diffractive optics configured to diffuse light that enters said light guide through said rearward surface and exits said light guide through said forward surface, wherein said diffractive optics comprises at least one holographic element.

* * * * *

UNITED STATES PATENT AND TRADEMARK OFFICE
CERTIFICATE OF CORRECTION

| | | |
|---|---|---|
| PATENT NO. | : 8,368,981 B2 | Page 1 of 1 |
| APPLICATION NO. | : 12/419263 | |
| DATED | : February 5, 2013 | |
| INVENTOR(S) | : Gruhlke et al. | |

It is certified that error appears in the above-identified patent and that said Letters Patent is hereby corrected as shown below:

In the Specifications:

In column 20 at line 45, Change "1A-10D." to --10A-10D.--.

In the Claims:

In column 24 at line 28, In Claim 20, change "diffractive," to --diffractive--.

Signed and Sealed this
First Day of October, 2013

Teresa Stanek Rea
*Deputy Director of the United States Patent and Trademark Office*